(12) United States Patent
Koch et al.

(10) Patent No.: US 10,321,117 B2
(45) Date of Patent: Jun. 11, 2019

(54) MOTION-CONTROLLED BODY CAPTURE AND RECONSTRUCTION

(71) Applicant: Lucasfilm Entertainment Co. Ltd., San Francisco, CA (US)

(72) Inventors: Hilmar Koch, San Francisco, CA (US); Ronald Mallet, Mill Valley, CA (US); Kim Libreri, Fairfax, CA (US); Paige Warner, San Francisco, CA (US); Mike Sanders, San Francisco, CA (US); John Gaeta, Ross, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 112 days.

(21) Appl. No.: 14/467,787

(22) Filed: Aug. 25, 2014

(65) Prior Publication Data
US 2015/0294492 A1 Oct. 15, 2015

Related U.S. Application Data

(60) Provisional application No. 61/978,729, filed on Apr. 11, 2014.

(51) Int. Cl.
*G06T 13/40* (2011.01)
*G06T 15/50* (2011.01)
*H04N 13/282* (2018.01)
*G06T 15/04* (2011.01)
*G06T 15/20* (2011.01)
(Continued)

(52) U.S. Cl.
CPC .......... *H04N 13/282* (2018.05); *G06T 13/40* (2013.01); *G06T 15/04* (2013.01); *G06T 15/205* (2013.01); *H04N 13/111* (2018.05); *H04N 13/243* (2018.05); *H04N 13/271* (2018.05); *H04N 2013/0081* (2013.01); *H04N 2013/0085* (2013.01)

(58) Field of Classification Search
None
See application file for complete search history.

(56) References Cited

U.S. PATENT DOCUMENTS

2002/0158873 A1* 10/2002 Williamson ............ G06T 7/002
                                                    345/427
2003/0001846 A1* 1/2003 Davis ................... G11B 27/031
                                                    345/474
(Continued)

*Primary Examiner* — Tize Ma
(74) *Attorney, Agent, or Firm* — Kilpatrick Townsend & Stockton LLP

(57) ABSTRACT

A method of generating unrecorded camera views may include receiving a plurality of 2-D video sequences of a subject in a real 3-D space, where each 2-D video sequence may depict the subject from a different perspective. The method may also include generating a 3-D representation of the subject in a virtual 3-D space, where a geometry and texture of the 3-D representation may be generated based on the 2D video sequences, and the motion of the 3-D representation in the virtual 3-D space is based on motion of the subject in the real 3-D space. The method may additionally include generating a 2-D video sequence of the motion of the 3D representation using a virtual camera in the virtual 3-D space where the perspective of the virtual camera may be different than the perspectives of the plurality of 2-D video sequences.

17 Claims, 17 Drawing Sheets

(51) Int. Cl.
*H04N 13/243* (2018.01)
*H04N 13/111* (2018.01)
*H04N 13/271* (2018.01)
*H04N 13/00* (2018.01)

(56) References Cited

U.S. PATENT DOCUMENTS

| | | | |
|---|---|---|---|
| 2007/0146372 A1* | 6/2007 | Gee | G06T 13/00 345/474 |
| 2008/0037829 A1* | 2/2008 | Givon | G06K 9/3216 382/107 |
| 2010/0020073 A1* | 1/2010 | Corazza | G06T 13/40 345/420 |
| 2013/0009950 A1* | 1/2013 | Ben-David | G06T 15/04 345/419 |
| 2013/0250050 A1* | 9/2013 | Kanaujia | H04N 13/0007 348/42 |
| 2014/0219550 A1* | 8/2014 | Popa | G06K 9/00342 382/154 |
| 2015/0193979 A1* | 7/2015 | Grek | G06F 1/1694 345/633 |

* cited by examiner

MOTION-CONTROLLED BODY CAPTURE AND RECONSTRUCTION

CROSS-REFERENCES

This application claims the benefit of U.S. Provisional Application No. 61/978,729, filed Apr. 11, 2014, entitled "MOTION-CONTROLLED BODY CAPTURE AND RECONSTRUCTION," which is hereby incorporated herein by reference for all purposes.

BACKGROUND

The process of recording the movement of objects or people is generally referred to as motion capture, and has many applications in entertainment, sports, medical imaging, video gaming, computer vision, and robotics. During a motion capture session, the movement of an actor can be sampled by cameras configured to track the motion of a finite number of retro-reflective markers worn by the actor. Animation data can be derived from the image samples and mapped to a 3-D model such that the 3-D model performs actions similar to the live actor by correlating motion of the reflective markers with animation controls on the 3-D model. Traditional motion capture techniques record only the movements of the reflective markers worn by the actor and purposely disregard the visual appearance of the actor.

BRIEF SUMMARY

In some embodiments, a method for capture and reconstruction may be presented. The method may include receiving a plurality of 2-D video sequences of a subject in a real 3-D space. Each 2-D video sequence in the plurality of 2-D video sequences may depict the subject from a different perspective. The method may also include generating a 3-D representation of the subject in a virtual 3-D space. A geometry and texture of the 3-D representation may be generated based on the plurality of 2D video sequences, and motion of the 3-D representation in the virtual 3-D space may be based on motion of the subject in the real 3-D space. The method may additionally include generating a 2-D video sequence of the motion of the 3D representation using a virtual camera in the virtual 3-D space. A perspective of the virtual camera may be different than the perspectives of the plurality of 2-D video sequences.

In some embodiments, a system comprising with one or more processors and a non-transitory storage memory comprising instructions may be presented. The instructions may cause the one or more processors to perform operations including receiving a plurality of 2-D video sequences of a subject in a real 3-D space. Each 2-D video sequence in the plurality of 2-D video sequences may depict the subject from a different perspective. The operations may also include generating a 3-D representation of the subject in a virtual 3-D space. A geometry and texture of the 3-D representation may be generated based on the plurality of 2D video sequences, and motion of the 3-D representation in the virtual 3-D space may be based on motion of the subject in the real 3-D space. The operations may additionally include generating a 2-D video sequence of the motion of the 3D representation using a virtual camera in the virtual 3-D space. A perspective of the virtual camera may be different than the perspectives of the plurality of 2-D video sequences.

In some embodiments, a non-transitory storage medium may be presented. The storage medium may include instructions which, when executed by one or more processors, cause the one or more processors to perform operations including receiving a plurality of 2-D video sequences of a subject in a real 3-D space. Each 2-D video sequence in the plurality of 2-D video sequences may depict the subject from a different perspective. The operations may also include generating a 3-D representation of the subject in a virtual 3-D space. A geometry and texture of the 3-D representation may be generated based on the plurality of 2D video sequences, and motion of the 3-D representation in the virtual 3-D space may be based on motion of the subject in the real 3-D space. The operations may additionally include generating a 2-D video sequence of the motion of the 3D representation using a virtual camera in the virtual 3-D space. A perspective of the virtual camera may be different than the perspectives of the plurality of 2-D video sequences.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
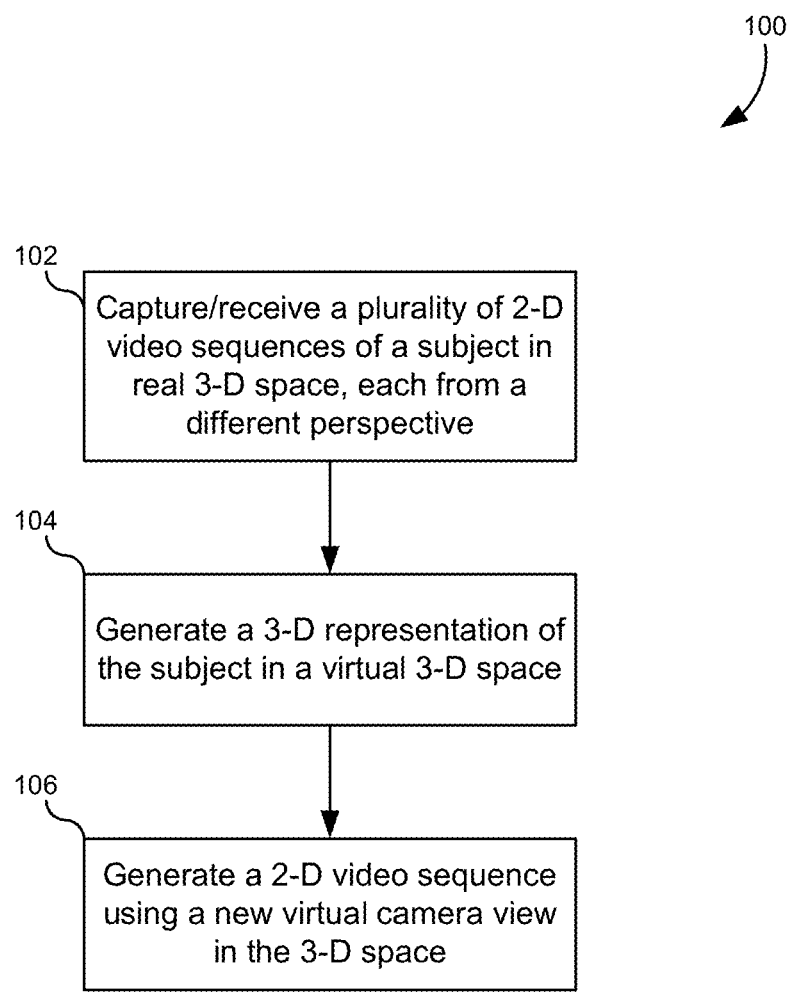
FIG. 1 illustrates a flowchart of a method for generating unfilmed camera views, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are embodiments of a general-purpose scene acquisition system. Multiple cameras can be used to capture a motion sequence of an actor in a real 3-D space. Each camera can capture the motion sequence from a different perspective. The cameras are able to capture the surface properties and textural properties of the actor as the actor performs complex movements. The multiple perspectives for each frame can be processed by a computer system in order to generate a 3-D representation of the motion sequence of the actor. The surface properties and textural properties of the actor can be used to generate a 3-D geometry with textures and colors that match the actual actor at a level of detail that can capture every fold in the actor's clothing. In some cases, a pre-existing 3-D model of the actor can be used to fill in any holes in the constructed 3-D geometry. The lighting variances captured by the plurality of cameras can be removed from the 3-D representation of the actor and new lighting effects can be applied. The motion sequence can be played in a virtual 3-D space, and virtual cameras can be positioned and moved in any way in order to generate new synthetic views of the motion sequence that were unfilmed, and which may be difficult to capture using live-action photography.

Existing motion capture systems use static cameras surrounding a subject to capture video of the subject from multiple viewpoints within a physical environment. However, use of static cameras does not allow for efficient capture of the performance of a subject in a large volume environment with a reasonable number of cameras. Action sequences in modern movies often involve superhero characters whose movements and fight scenes can take place over a large geographic area. Currently, small numbers of static cameras simply cannot be used to capture character movement throughout an action sequence at a level of detail that is convincing to a viewer. Additionally, traditional computer graphics techniques for rendering synthetic humans driven by motion capture animation to create the illusion of live action sequences in a virtual 3-D space tend to look unrealistic and cannot create novel camera views. Virtual cameras must be positioned at the same locations as the static cameras, which places limits on what a director can do to modify a scene after filming. In order to have a camera view that swoops over and around a subject, a real camera must be moved along this complicated path in the real 3-D space.

As used herein, the term "subject" refers primarily to a live human actor performing a motion sequence. However, the term subject may also refer to animals, objects, and other portions of an environment observed by multiple cameras. Additionally, a subject may include combinations of live human actors, objects, and/or animals. For example, in filming a "subject" a video sequence may capture a fight between a live human actor and an animal. In some embodiments, the subject refers to an entire live human actor, including the face, hair, body, appendages, clothing, and articles carried by the actor. Another example may include a car crash simulation and may involve other non-living objects. This can be distinguished from simply capturing expressions and emotions of the face of an actor, which generally involves different algorithms and technologies.

Although filming motion of an actor will be used primarily as an example in this disclosure, the applications of the inventive concepts described herein is not so limited. Many sporting events could benefit from multiple cameras focusing on an athlete. For example, football stadium camera systems could focus on a football carrier as he crosses the goal line of the end zone. These technologies can then be used to generate a camera view directly above the player, directly to the side of the player, or from any other perspective that could help determine whether a touchdown scored. In another example, a concert could be filled by multiple cameras, and a producer could generate novel camera views of each musician during production of a live concert video. In some embodiments, the user could even manipulate a virtual camera and watch the concert from any perspective they choose using software operating on a home video player. Other embodiments may enable broadcast content to be navigable in real-time for users. Other embodiments can generate virtual or augmented reality scenarios based on recorded scenes. For example, users could insert themselves into a prerecorded scene with the point of view of the user acting as the virtual camera. This virtual camera could then generate new views that would correspond to what the user would see in the virtual reality situation. Other embodiments may be used for industrial and military applications. For example, military training scenarios could adapt to user actions to provide a more responsive training environment. Likewise, industrial training scenarios could present a more realistic training environment that could adapt to user actions.

In some embodiments, the motion capture and reconstruction algorithms and systems described herein may utilize and/or process video feeds from various camera sources. For example, many people attending a live event may be concurrently filming the event using portable camera devices, such as those found on modern smart phones. These "crowd-sourced" video feeds could be collected and used to generate unfilmed video sequences of the event, or to supplement the video feeds provided by official video sources filming the event. Crowd-sourced video feeds may be particularly useful when filming events that include a number of different subjects, such as concerts with multiple band members, or sporting events with multiple athletes. Additionally, crowd-sourced video sequences can play a role in capturing and recreating live news events. For example, most video footage of unplanned, live, new events is often captured by private citizens with personal recording devices. The video sequences from these devices can be collected and used to generate an unfilmed view of the news event (such as a plane crash, an explosion, a battlefield, etc.) that may be used to better document the event. This example also illustrates how a "subject" can include everything from living actors, to large objects. In some embodiments, a particular assignment can be made to various individuals to capture video of a single subject. For example, people on the left side of the stage may be instructed to focus their camera views primarily on the bass player in a band. This can increase the spatial resolution of the images captured by each subject by intersecting higher number of camera views on the particular subject. In other embodiments, video streams can be analyzed after the fact to determine which, if any, subject in a scene is primarily captured by the video sequence.

The various areas of application described in the preceding paragraphs should make clear that many different platforms may be used to implement the motion capture and reconstruction algorithms described herein. For exemplary purposes, a general purpose computing system is described as a way to implement some embodiments. However, many different platforms for generating unfilmed views of a subject may be used by other embodiments. For example, other platforms may include mobile computing devices, tablet computers, set-top boxes, smart TVs, smart phones, augmented and/or virtual reality glasses, and/or the like. Generally, any computing system that can be used to process video sequences as described herein could be used by various embodiments. For example, as content becomes more interactive, a display device—such as a TV, movie screen, or computer display—may become the primary platform for generating unfilmed views of the subject as users interact with the technology. In another embodiment, the platform may comprise a cloud-based computing service where video feeds can be uploaded and coordinated in order to generate unfilmed views.

In order to provide an enabling disclosure, different systems, algorithms, examples, and/or embodiments will be presented below. First, a general algorithmic framework and hardware/software system design will be described for capturing 2-D video sequences, generating a 3-D representation, and generating a final 2-D video sequence from a virtual 3-D space using new camera views and lighting. Then, each of these three steps will be described in greater detail, and the hardware systems that may be used for each step will be presented and described.

FIG. 1 illustrates a flowchart 100 of a method for generating unrecorded camera views, according to some embodiments. The method may include receiving or capturing a plurality of 2-D video sequences of the subject in a real 3-D space (102). Each 2-D video sequence may film the subject from a different perspective. The plurality of 2-D video sequences may be captured by a plurality of cameras arranged around a subject in real 3-D space. For example, cameras may be arranged around an area in a geodesic sphere or in a grid pattern in order to capture the motion of the subject from many different perspectives.

The area that may be captured by the plurality of cameras may be referred to herein as a "motion capture area". The motion capture area may include fiducial markers located in the real 3-D space that can be used to iteratively calibrate the plurality of cameras. For example, each camera can locate one or more of the fiducial markers within the camera's field of view. Based on the fiducial marker locations, a precise location, direction, and/or rotation for each camera can be determined.

It should be emphasized that the terms "video," "motion capture," "camera," "image," and "video sequence" are merely exemplary and not meant to be limiting. These terms simply reflect one exemplary embodiment that is used herein as a vehicle to provide an enabling disclosure. However, cameras, motion capture cameras, machine vision cameras, and other camera types may generally be considered sensors. Images and/or video sequences may generally be considered sensor outputs. Therefore, the terms camera, motion capture camera, video camera, machine vision camera, and/or the like used throughout this disclosure may generally be replaced with any type of sensor used to capture information associated with a real world scene. Likewise, the terms image and video sequence used throughout this disclosure may generally be replaced with any type of sensor output that embodies the information associated with the real world scene captured by the sensor.

In some embodiments, wide angle cameras can be used to capture the entire motion capture area at once. In other embodiments, at least some of the cameras may be motion controlled such that they zoom, rotate, and redirect their views such that a high-quality (e.g. high resolution, high dynamic range, and low noise) image of the subject is captured throughout the motion sequence. In order to keep each of the cameras focused on the subject throughout the motion sequence, the subject location can be tracked using two or more tracking cameras, RF tags, and/or any other method of tracking an object in real 3-D space.

In order to light the subject evenly during the motion sequence, dynamic lighting controls can be used such that light can be reduced as the subject moves closer to a particular light. Any lighting system may be used that can provide even lighting on the subject. For example, ring lighting may be used on each of the cameras to illuminate the subject. As the subject moves closer to a particular camera, the ring lighting may be reduced such that the subject is not overly saturated with light from that camera perspective. Embodiments that do not relight the 3D models may not need to balance the lighting during the capture phase. When the 3-D model undergoes a relighting process, balancing the lighting during the video capture phase can ensure that the illumination of the subject fits within the dynamic range of each camera as closely as possible. For example, as the subject comes closer to a particular light, the illumination of the subject will increase on the side closest to the light. Therefore, the output of this particular light can be adjusted such that the illumination of the subject remains balance and even.

In some embodiments, each camera may comprise a high definition visible light camera, as well as a machine vision camera. Any depth sensing camera may be used. In some embodiments, a machine vision camera may be configured to receive infrared (IR) light. An IR emitter can project a speckled IR noise pattern onto the subject. This allows the machine vision camera to capture the geometry of the subject, while the visible light camera captures the texture of the subject. In some embodiments, the machine vision camera may be primarily used to capture the geometry the subject, while the visible light camera is also used to supplement the machine vision camera in reconstructing the geometry of the subject. As described below, the system can first determine a cutout silhouette of the subject, then the surface can be reconstructed based on the outputs of the machine vision cameras, and then the surface reconstruction can be augmented by the video sequences recorded by the visible light cameras. The reconstruction algorithms can generally accept multiple data sources. These data sources can include cutout silhouettes, machine vision camera outputs, visible light camera outputs, depth sensing camera outputs, and/or the like. In some embodiments, each of the data sources used in the reconstruction algorithm need not be captured at the same temporal frequency. For example, if the machine vision camera only collects images at 15 frames per second, a faster visible light camera can be used to augment the machine vision images by generating motion vectors.

For exemplary purposes, the embodiments described herein may use an IR projection coupled with an IR machine vision camera in order to sense depth. Other embodiments may use different techniques for sensing death and thereby capturing the geometry the subject. For example, flash LIDAR is a technique of casting a laser pulse through a prism and scattering it across the motion capture area. The reflection of the laser registers on a collection sensor and provides a value that represents depth based on time-of-flight of the sample or intensity of the returned signal. In another embodiment, a structured light methodology can be used where a known image pattern is projected onto the motion capture area. A sensor images the motion capture area and an algorithm determines the surface of the subject based on how the known projected pattern warps across the received image. In other embodiments, dense stereo methods can utilize two or more image frames from cameras in known/calibrated locations relative to each other. The synchronized images from each camera may include pixel matches from one image to the other image. Ray calculations can be used to determine intersection points in 3-D space that represent depth values for the surface at each pixel point. In other embodiments, an alternating frame technique can be used where a high-frame-rate RGB sensor alternates between the "beauty image" provided by the visible light cameras and a noise projection or structured light projection. This allows a single camera to acquire both RGB and pixel depth information.

As the subject is tracked throughout the motion capture area, each of the cameras can move (e.g. pan, tilt, rotate, etc.) responsive to the movement of the subject. Additionally, the cameras can change their zoom and focus settings dynamically based on the distance of the subject from each camera. In other embodiments, a larger number of static cameras may also be used.

The method may also include generating a 3-D representation of the subject in a virtual 3-D space (104). The texture and geometry of the 3-D representation can be generated based on the texture and geometries captured in the plurality of 2-D video sequences from the cameras. Therefore, the motion of the 3-D representation in the virtual 3-D space can match the motion of the subject in the real 3-D space.

The plurality of 2-D video sequences from the cameras can be sent to a computer system for processing. In some embodiments, a geometry of the 3-D representation of the subject can be generated using a 2-D cutout silhouette of the subject from each of the video sequences. The cutout silhouettes from each camera perspective can be compared to determine where the outlines of each cutout silhouette intersect between the various video sequences. Then, the cutout silhouettes can be combined to generate a 3-D volumetric representation of the geometry of the subject for each frame. In some embodiments, the subject can be distinguished from the background in each frame because the subject reflects the speckled IR noise pattern. In some embodiments, the 3-D volumetric representation, or shells of the geometry of the subject may be incomplete. Therefore, a pre-existing 3-D digital model of the subject can be used to fill any holes (e.g. armpits, hair, and other areas that may not be clearly captured by the cameras). Textures can then be applied to the 3-D representation based on the visible light portion of the 2-D video sequences.

The method may further include generating a 2-D video sequence using a new camera view in the virtual 3-D space (106). The lighting specific to each of the original 2-D video streams can be removed from the model and new lighting characteristics can be applied. Virtual cameras in the computer-generated environment can be placed and moved to generate sequences of the performance from varying viewpoints that may not have been captured by the physical cameras. For example, viewpoints can range from wide-open shots, to close up shots, and can include camera movements that would be very difficult to duplicate using a real-world camera system. In some embodiments, the textures seen by the virtual camera can be taken from 2-D camera views of the real-world cameras that most closely match the virtual camera perspective. Thus, the texture pixels seen by the virtual camera can be dynamically sourced from different 2-D video sequences as the virtual camera moves around the subject.

Figure 2A:
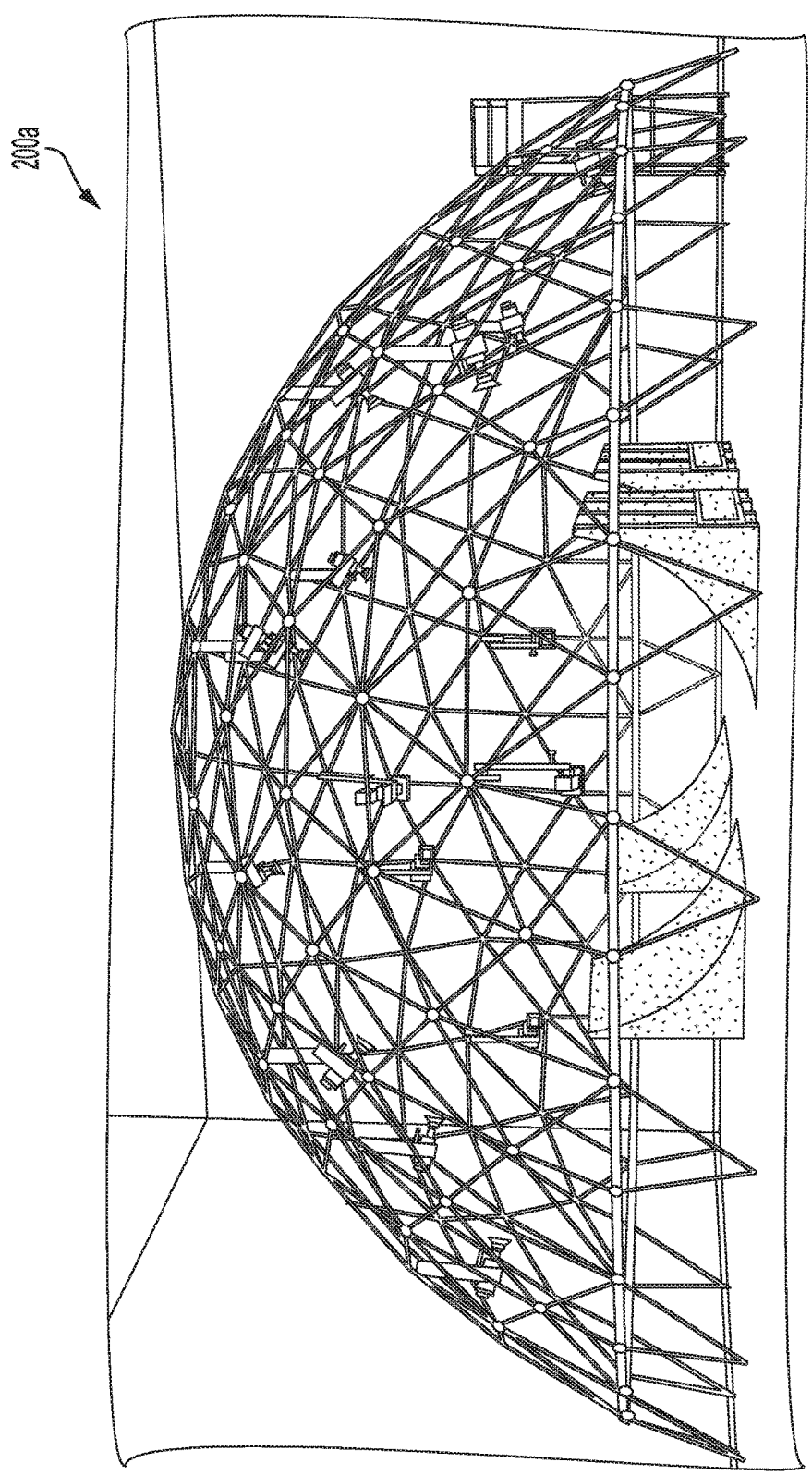
FIG. 2A illustrates an exemplary camera set up to capture motion and surface characteristics of a subject in a real-world environment, according to some embodiments.

FIG. 2A illustrates an exemplary camera set up to capture motion of a subject in a real-world environment, according to some embodiments. Here, 16 different camera setups were used to capture the motion sequence in the motion capture area. It should be noted that the number of cameras used in any embodiment can be optimized to generate the desired spatial density. Therefore, the 16 cameras used in this embodiment is merely exemplary and not meant to be limiting. Other embodiments may use significantly more or fewer cameras. The motion capture area may include obstacles or other environmental constructs that actors can use to create a scene. In many cases, objects in the motion capture area may be coated in a green or blue material such that "green screen" technology may be used to insert the performance of the subject into a virtual environment. In this particular embodiment, the motion capture area includes a pair of skateboard-style ramps that may be used to simulate the motion of the subject on a skateboard, surfboard, hover board, and/or the like. As described above, crowd-sourced video may also be used by some embodiments to increase the spatial resolution of the system and minimize occlusions. It should also be noted that embodiments can freely trade the number of cameras used or resolution of the cameras in exchange for accuracy. If a certain embodiment calls for lower resolution, then fewer cameras may be used.

The cameras can be spaced and distributed around the motion capture area in order to best provide different perspectives of the subject during the motion sequence. For example, in FIG. 2A the cameras are distributed evenly around a geodesic sphere that encloses the motion capture area. In some embodiments, the geodesic sphere arrangement may be advantageous in order to capture video sequences of the subject from many possible perspectives, including overhead perspectives. Additionally, the geodesic sphere will space the cameras at equal distances from the subject when the subject is in the middle of the motion capture area.

For exemplary purposes, some embodiments described herein will use cameras that are statically located and able to pin, tilt, rotate, and/or zoom in order to follow the subject through the motion sequence. Other embodiments may use static cameras that are not equipped with motion controls. Other embodiments may also use fully mobile cameras that can change their location in a predetermined fashion, or in response to the motion of the subject. Some embodiments may use combinations of these various camera types. For example, some embodiments may use a number of static cameras, along with a number of mobile cameras, any of which may be motion controlled for pan, tilt, rotate, and/or zoom.

The size of the motion capture area can be very large as illustrated by FIG. 2A, such that it can encompass large stunt props and facilitate the capture of extensive motion sequences over a larger geographic area. However, some embodiments may distribute cameras around a relatively small area, such as the size of a studio room. This can accommodate motion capture areas that are small and more easily allow the subject to dominate the field of view of each camera without requiring extensive refocusing and camera movement.

In some embodiments, each of the cameras will be statically placed and allowed to move and refocus as will be described below. However, in other embodiments, the cameras may be portable and/or in motion while capturing video sequences of the subject. For example, sporting venues may incorporate a moving camera that operates above a football field. In another example, technicians may operate handheld cameras during a live performance, such as at a concert event. In order to incorporate portable cameras, the methods described herein may track the location of the portable cameras throughout the video sequence capture session. As individual frames between the video sequences are used during the reconstruction process, the portal camera location at the time each frame was captured can be used in constructing the 3-D representation of the subject in that particular frame.

Figure 2B:
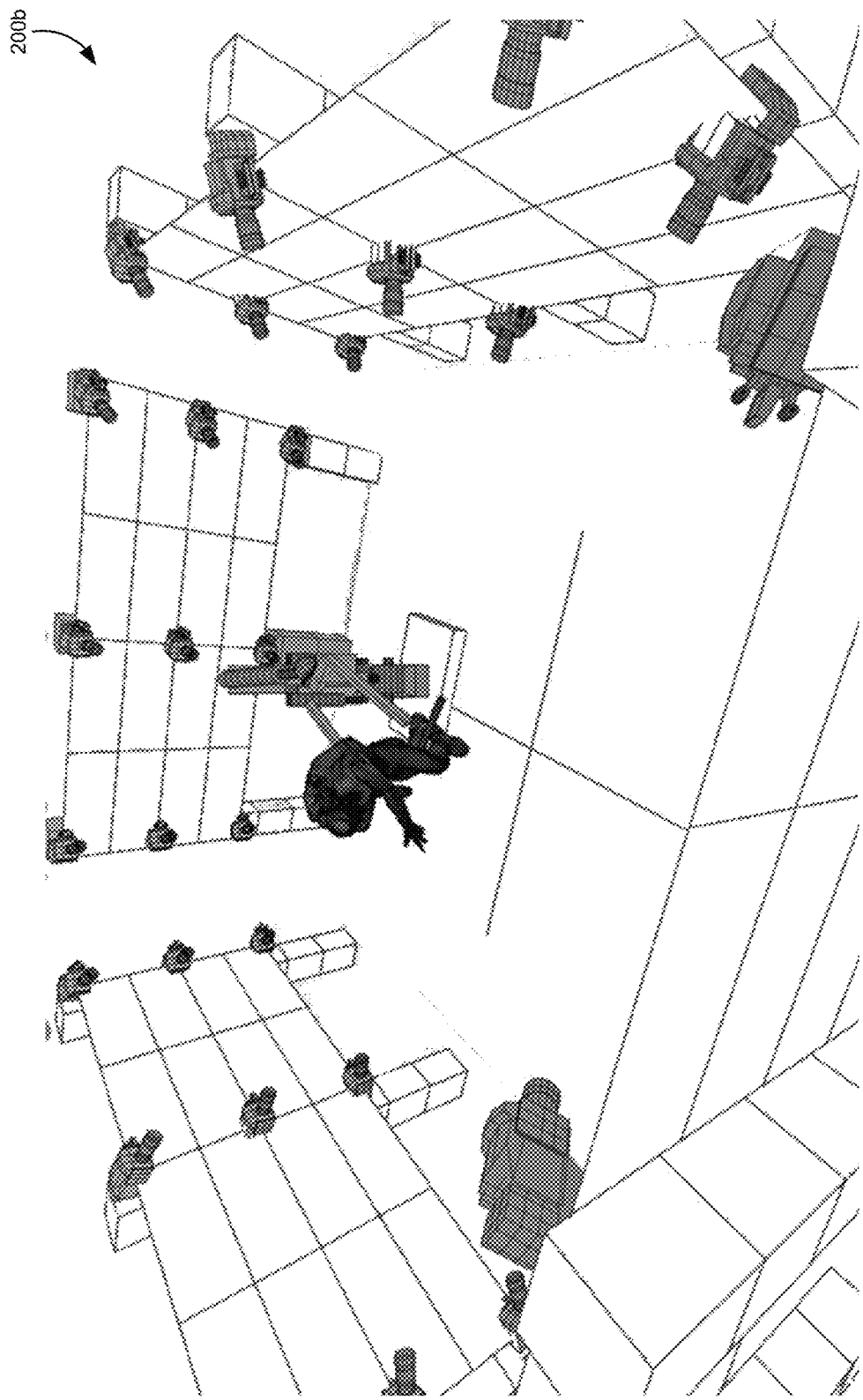
FIG. 2B illustrates a second exemplary camera set up to capture motion of the subject in a real-world environment, according to some embodiments.

FIG. 2B illustrates a second exemplary camera set up to capture motion of the subject in a real-world environment, according to some embodiments. Note that the cameras in this embodiment are placed in a room that is much smaller in size relative to the geodesic sphere of FIG. 2A. Also note that the cameras in this embodiment are arranged in a grid pattern along the walls of the room along the exterior of the motion capture area. Advantages of using smaller motion capture areas may include requiring less camera movement, more even lighting, and/or the ability to capture greater detail of the subject. However, as the cameras are located closer to the subject, faster subject movements may require the cameras to pan, tilt, and/or rotate faster than they would when capturing the subject at a greater distance.

Figure 3:
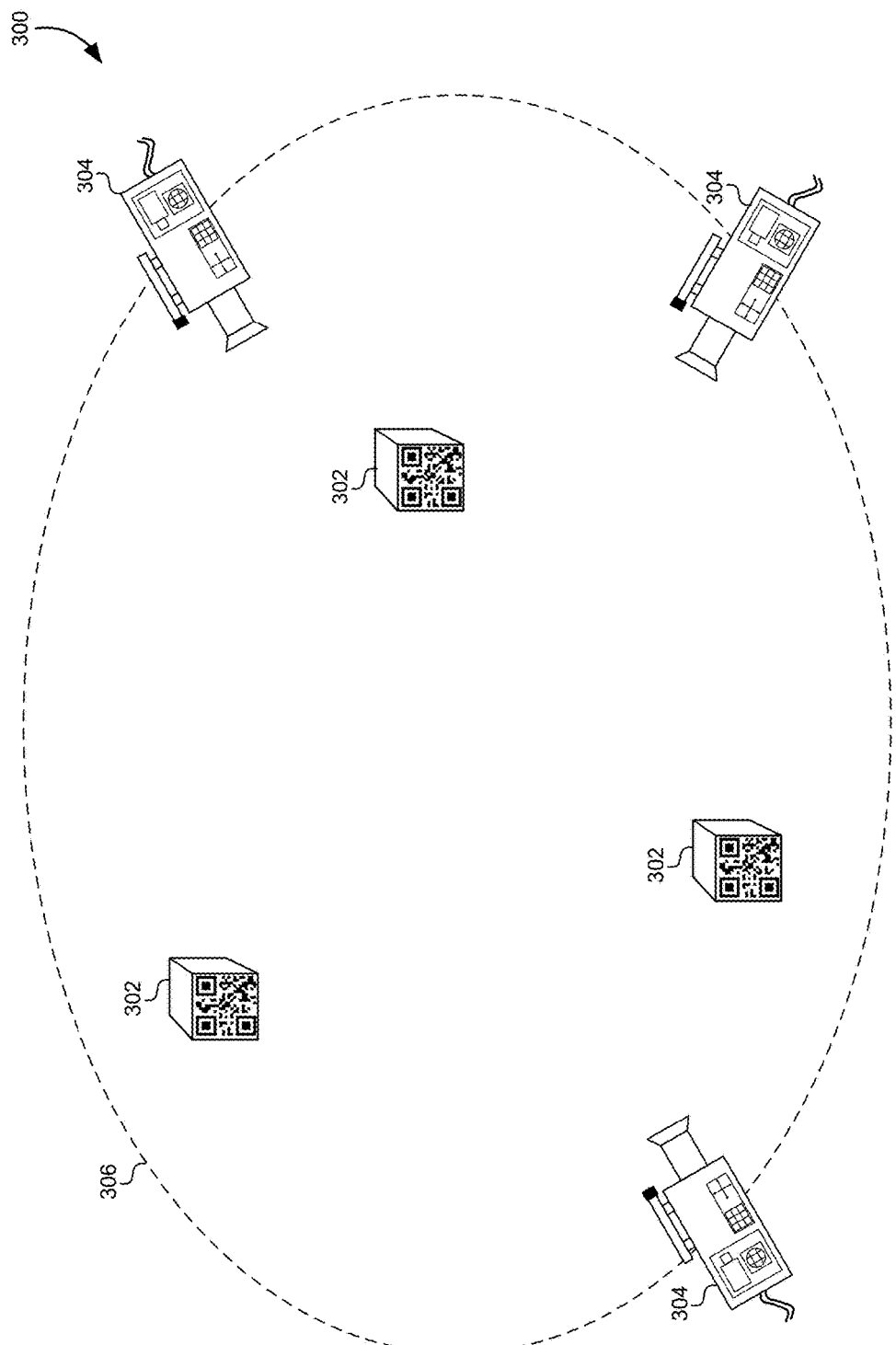
FIG. 3 illustrates a system for calibrating the position of the camera used in motion capture, according to some embodiments.

FIG. 3 illustrates a system for calibrating the position of the camera used in motion capture, according to some embodiments. In order to use stationary cameras, it may be necessary to control the motion of the cameras such that each camera remains focused on the subject throughout the video sequence. As described below, the camera systems used by embodiments described herein may include computer-controlled mechanical components that can, tilt, rotate, and/or focus the camera according to instructions received by the computer system. Some camera control systems may require that a starting position, orientation, and focus for each camera needs to be ascertained before filming the motion sequence of the subject.

According to FIG. 3, each camera in the system can undergo a calibration sequence prior to filming the subject. The cameras 304 may begin at any position, orientation, and zoom factor. Each of the cameras 304 can then locate individual fiducial markers 302 within the motion capture area 306. Each of the fiducial markers 302 can be individualized such that cameras can locate and focus on one or more of the fiducial markers 302 during a calibration sequence. The fiducial markers 302 may comprise any visual marker that can be identified by a computer vision system. For example, the fiducial markers 302 may include digitally encoded graphics similar to a quick-response (QR) code that includes a black digital pattern on a white background. These types of fiducial markers 302 may be easily distinguished by the camera system from the background and/or any props or obstacles in the motion capture area 306.

The fiducial markers 302 may be evenly spaced throughout the motion capture area 306. In some embodiments, each camera can scan the visible area and locate each of the fiducial markers 302 one by one. As each of the fiducial markers 302 are found, each particular camera can record the pan, tilt, rotate, and/or zoom settings of the camera to be transmitted to a computer system. In some embodiments, an iterative calibration method may be used where either (1) an error threshold is reached, or (2) a predefined number of iterations is reached. Each iteration can attempt to decrease the calculated error values for the determined location of each of the fiducial markers 302. Depending on the desired accuracy of the system, the calibration procedure for calibrating all of the cameras in parallel can take anywhere from a few seconds to a few minutes.

It will be understood that the calibration method and the fiducial markers 302 described above are merely exemplary and not meant to be limiting. Other methods may be used for calibrating the cameras 304. For example cameras 304 may be manually calibrated by an operator. In another example, the cameras 304 can be rotated, panned, tilted, and/or zoomed to a known starting point and then adjusted relative to that starting point throughout the motion capture session. The fiducial markers 302 may also include infrared markers, RF markers, or any other type of marker that could be detected relative to a camera position, orientation, and/or zoom.

As described above, some embodiments may use a plurality of stationary cameras. Because the cost of each camera set up may cost hundreds of thousands of dollars, it may be advantageous to reduce the number of cameras required to fully capture the motion of the subject. Therefore, instead of using a very large number of cameras to capture the motion of the subject from every angle, the embodiments described herein may use a fewer number of fixed cameras that are configured to remain focused on the subject as the subject moves throughout the motion capture area. Therefore, some embodiments may incorporate a system for tracking the location of the subject within the real 3-D space of the motion capture area. This location can then be used to control the pan, tilt, rotation, and/or zoom of each of the individual cameras based on their location and starting characteristics as configured and/or ascertained by the calibration process described above.

Figure 4:
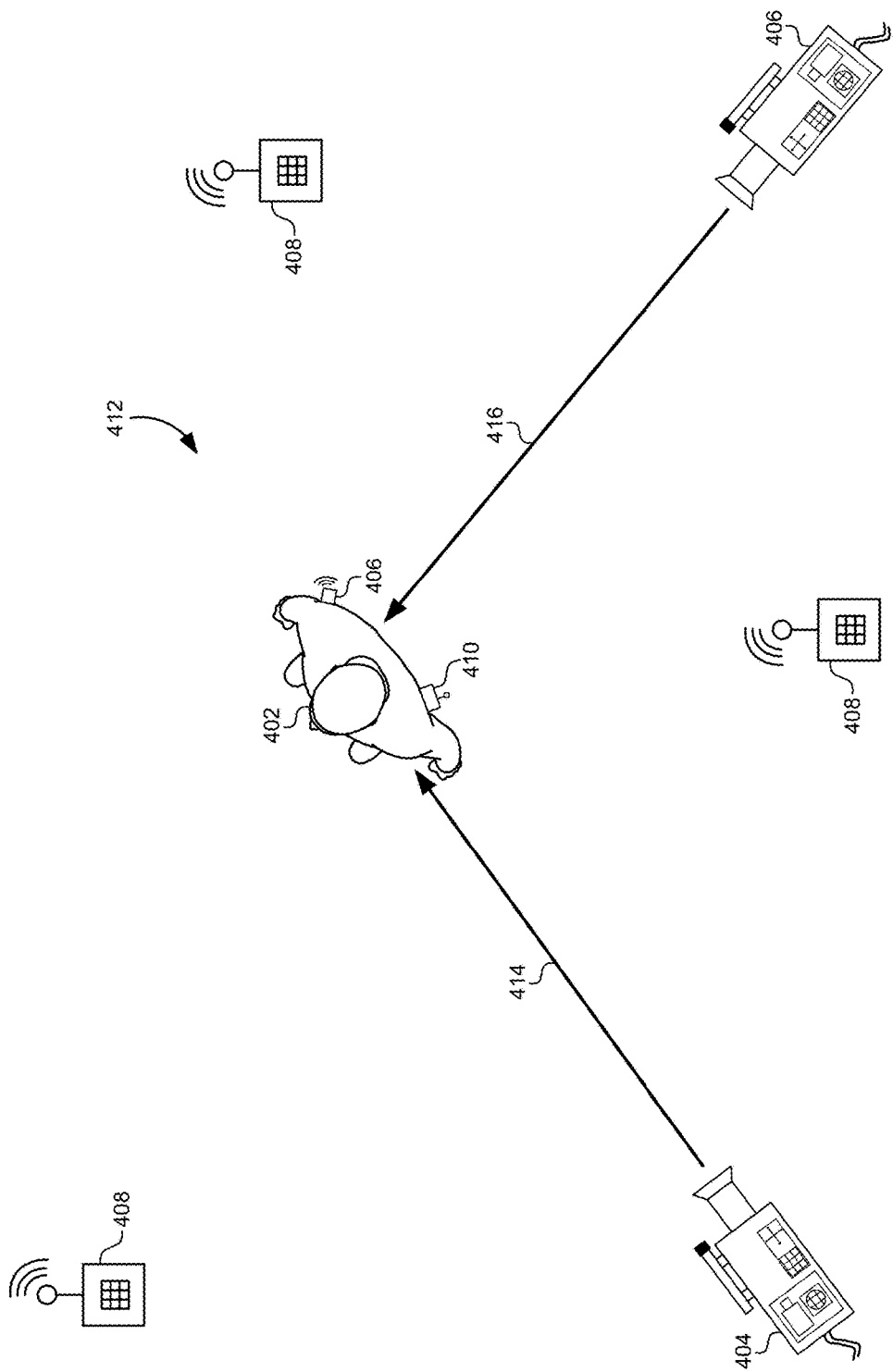
FIG. 4 illustrates systems for tracking a subject in a motion capture area, according to some embodiments.

FIG. 4 illustrates systems for tracking a subject in a motion capture area, according to some embodiments. In this particular set up, two or more cameras may be used to track a subject 402 in a motion capture area 412. Here, a first camera 404 and a second camera 406 can follow the subject 402 during the motion capture session. The first camera 404 and the second camera 406 may be configured to automatically detect and track motion within their fields of view. Alternatively or additionally, the first camera 404 and/or the second camera 406 may be manually operated by a human operator. The human operator may follow the subject 402 through a viewfinder of the cameras 404, 406 such that the subject 402 remains centered in the viewfinder of each of the cameras 404, 406. A first ray 414 and the second ray 416 corresponding to the optical paths of the first camera 404 and the second camera 406 respectively, will intersect within the real 3-D space at the coordinates of the subject 402. Based on the position and orientation of the cameras 404, 406, a computer system can calculate the coordinates in the real 3-D space of the subject 402. These coordinates can then be used to calculate motion control parameters for each of the plurality of cameras recording the motion of the subject.

It will be understood that using two or more cameras to track the subject 402 as described above is merely exemplary and not meant to be limiting. Other techniques may also be used to track the location of the subject 402 within the motion capture area 412 to generate coordinates in the real 3-D space. In some embodiments, an RF tag 406 or transmitter may be affixed to the subject 402. RF transmitters/receivers 408 may be distributed around the motion capture area 412 such that the location of the subject 402 may be triangulated or otherwise ascertained based on RF transmissions from the RF tag 406. Alternatively or additionally, a GPS receiver 410 may be affixed to the subject 402. GPS coordinates transmitted from the GPS receiver 410 can be received by a computer system and the coordinates of the subject 402 in the real 3-D space can be calculated. Other types of sensors may also be used, such as proximity detectors, radar, microwave emitter/receivers, depth sensor devices, wide-angle machine-vision cameras, and/or the like.

Figure 5:
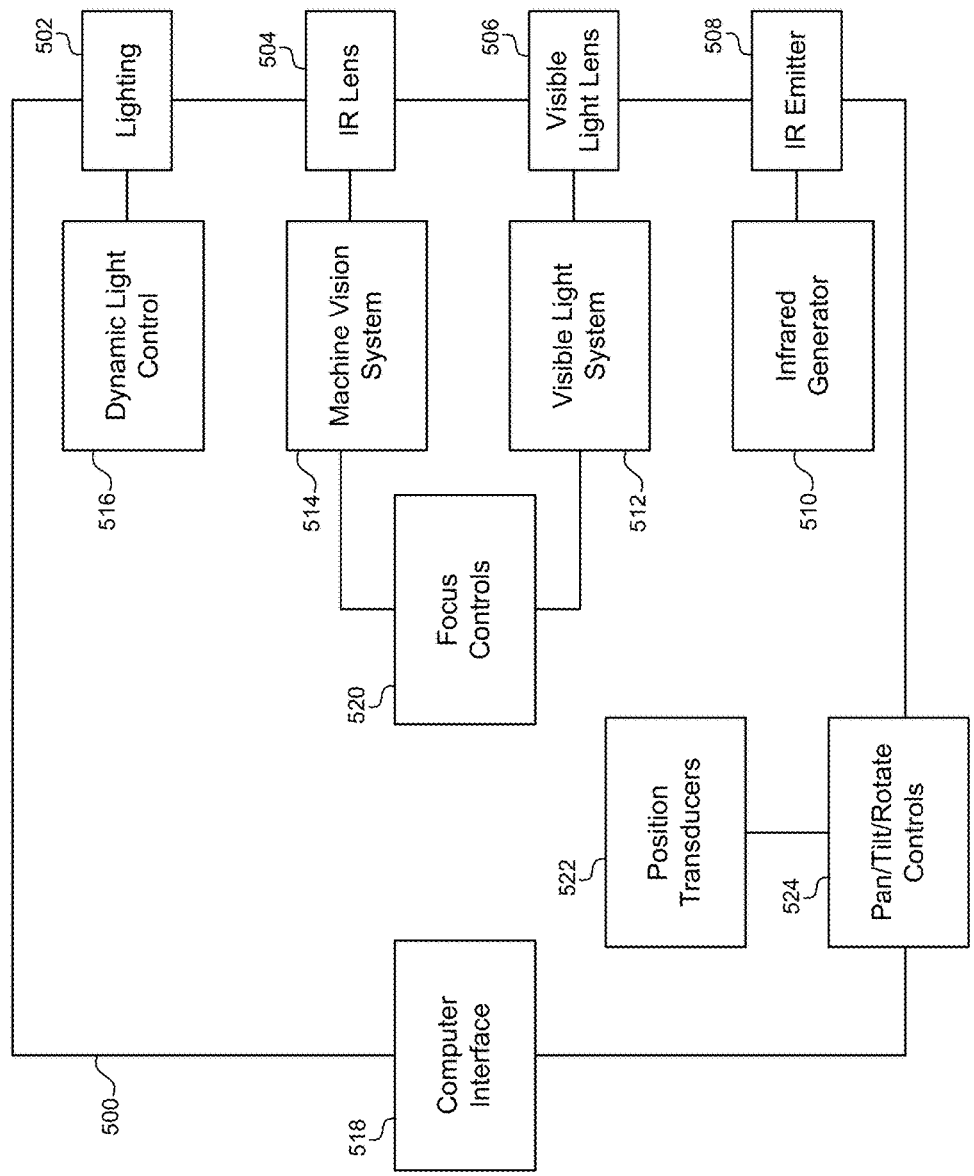
FIG. 5 illustrates an exemplary camera system, according to some embodiments.

FIG. 5 illustrates an exemplary camera system 500, according to some embodiments. Camera setup 500 may be representative of each of the plurality of cameras used to capture a video sequence of the subject. Note that in various embodiments, some camera setups may include all of the features described in relation to camera system 500, while other camera setups may include only a subset of the features described in relation to camera system 500. Camera system 500 is configured to change the optical characteristics, positioning, lighting, and direction of captured video sequences of the subject as the subject moves throughout the motion capture area.

The camera system 500 may include a visible light lens system 506 configured to capture video footage of the subject. The visible light lens 506 may be communicatively coupled with a visible light camera system 512. In one particular embodiment, the visible light lens 506 and the visible light camera system 512 may be implemented using a Sony F65 digital motion picture camera. The Sony F65 can capture images that are 8 k across, using 20 megapixels, 120 frames per second, and 14 stops of latitude. It may be advantageous to use a camera such as the Sony F65 in order to capture detailed texture and lighting information in each frame.

The camera system 500 may be mounted to a mechanical fixture that allows the camera system 502 rotate, pan, and/or tilt in order to capture the subject throughout the motion capture area. The mechanical fixture may include directional controls 524 that are controlled using computer inputs. For example, as the location of the subject in the motion capture area is tracked according to the method described above in relation to FIG. 4, a computer system can calculate the real world coordinates of the subject. If the camera system 500 has been properly calibrated and initialized as described above, the computer system can then generate movement commands for the directional controls 524 that will move the camera system 500 such that the subject stays within a viewframe of the visible light lens 506 and the visible light system 512. Therefore, instead of using wide-angle views that could not capture as much texture detail of the subject, each camera can instead track the location of the subject and provide a zoomed-in, detailed view of the subject.

In some embodiments, the directional controls 524 may also include zoom controls. It should be noted that the zoom controls may also be integrated with the visible light system 512. For example, the Sony F65 may include a computer-controlled zoom control that is separate from the mechanical fixture or pan/rotate/tilt directional controls 524. Just as the directional controls 524 track the location of the subject, the zoom controls may also adjust the focal length of the visible light lens 506 such that the visible light system 512 continuously captures a view of the subject that is approximately the same size. This may also include controlling the focus of the lens to keep the subject in focus. For example, if the subject moves closer to the camera system 500, the visible light lens 506 can zoom out such that the subject occupies approximately the same percentage of the frame as before the subject moved.

The computer inputs received by the directional controls 524 may be calculated by the computer system using predictive methods to ensure that the subject is always in an optimal view of each camera. In some embodiments, the predictive methods can analyze the speed, position, and/or acceleration of the subject in order to ensure that the cameras move in time to always keep the subject in view. Additionally, the predictive methods can adjust the zoom characteristics of the camera system 500 in order to ensure that the view of the subject in each frame occupies a near constant area. For example, the zoom characteristics could be manipulated such that the subject occupies 40% of the area of each frame regardless of the distance between the subject and each particular camera.

Depending upon the particular motion capture environment, lighting characteristics can vary widely. In order to optimally capture both the geometry and texture of the subject, the lighting incident upon the subject should be kept as uniform as possible. Therefore, some embodiments may include a lighting fixture 502 and a dynamic light control 516 as part of the camera system 500. As the subject comes closer to the camera system 500, the dynamic light control 516 can reduce the amount of light emitted by the lighting fixture 502. Conversely, as the subject moves farther from the camera system 500, the dynamic light control 516 can increase the amount of light emitted by the lighting fixture 502. This can ensure that the subject does not appear washed out as the subject comes closer to the camera, while also increasing the lighting on the subject at further distances to ensure that adequate texture detail can still be captured. Note that in some embodiments, the dynamic light control 516 and the lighting fixture 502 may be implemented using a ring light mounted around the visible light lens 506 of the camera system 500. Additionally or alternatively, the dynamic light control 516 and the lighting fixture 502 may be separate from the camera system 500. For example, lighting fixtures may installed evenly around the motion capture area and controlled by a computer system that knows the position of the subject relative to each of the lighting fixtures.

In order to properly capture the geometry of the subject (i.e. the geometric volume occupied by the subject in each frame) each frame must be captured such that the subject can be separated from the background in the frame. Also, even when lighting is controlled as described above, the subject may be wearing clothing or may include surfaces that are difficult to capture and/or analyze by the camera system 500. For example, an actor may be wearing black and/or shiny clothing that reflects light and obscures the folds and movement of the actor and the clothing. Therefore, the camera system 500 may also include a machine vision system 514. The machine vision system may be configured to capture the geometry of the subject. In some embodiments, the texture of the subject can be captured and analyzed by the visible light system 512 and the geometry of the character can be captured by the machine vision system 514. This ensures that the scene can be evenly lit as seen by each camera and that the exposure on the actor can be balanced.

In order to distinguish between the subject and the background, the machine vision system 514 may include an IR emitter 508 coupled with an IR generator 510. The IR generator 510 may be configured to generate an IR radiation pattern to be emitted by the IR emitter 508. In some embodiments, the IR generator 510 may generate a speckled IR noise pattern that is projected onto the subject. The machine vision system 514 can include an IR lens 504 so that the machine vision system 514 will see primarily the subject illuminated by the projected IR noise pattern. Consequently, some embodiments may include an IR filter on the visible light lens 506 to isolate the texture analysis from the IR emissions. The IR speckled noise pattern is not as susceptible to reflective surfaces or variance in materials, such as clothing worn by the subject or painted surfaces of objects.

As stated above, the motion capture area may be surrounded by a plurality of instances of the camera system 500 described above. It will be understood that each camera system may include some or all of the features described above. In some embodiments, the visible light camera systems and/or dynamic lighting controls can be physically separate from the machine vision systems and infrared emitters. For example, one embodiment can include 6-8 IR projectors distributed around the motion capture area. Similarly, the machine vision systems may be implemented using cameras that are physically separated from the visible light systems.

A computer interface 518 can receive control inputs for the directional controls 524, as well as controls for the dynamic light control 516 and the IR generator 510. The computer interface 518 can also transmit positional information from the camera system 500 to a computer system. The computer interface 518 may also transmit the video sequences captured by the visual light system 510 and the machine vision system 514 to a computer system for texture and geometry reconstruction.

Figure 6:
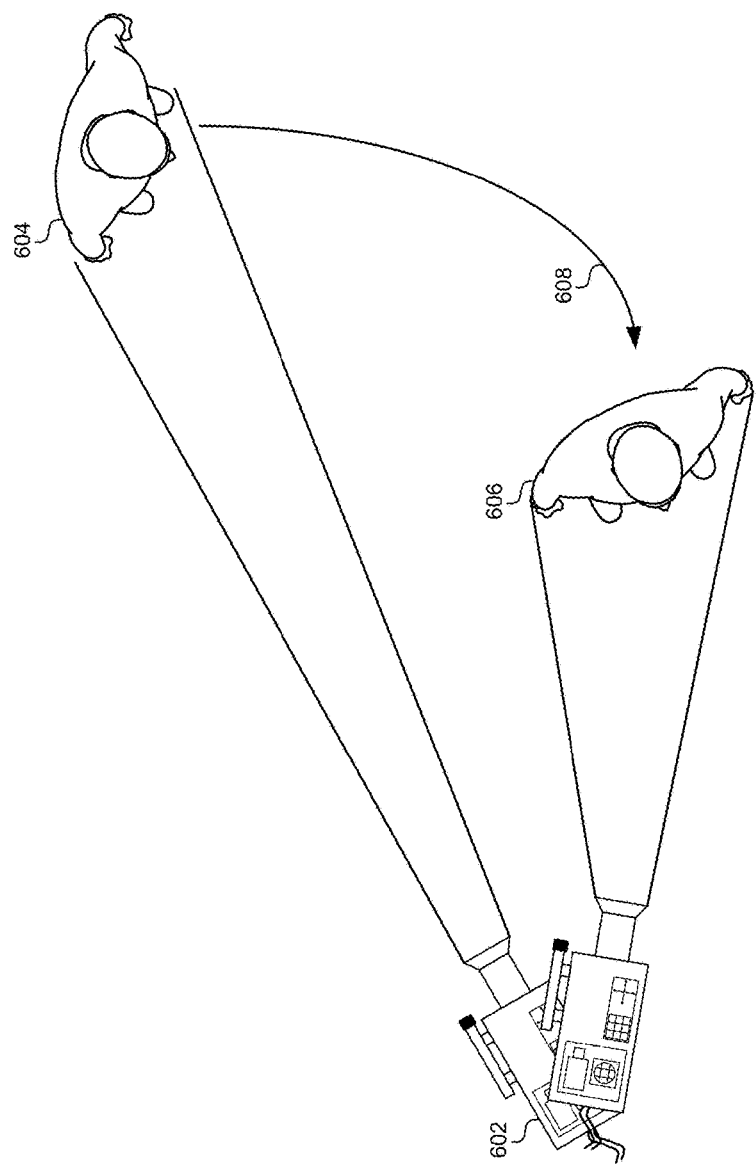
FIG. 6 illustrates an example of subject motion in relation to a camera, according to some embodiments.

FIG. 6 illustrates an example of subject motion in relation to a camera, according to some embodiments. Camera 602 may include one or more of the features of the camera system 500 described above in relation to FIG. 5. The camera 602 can capture a subject that a first position 604 in the first frame of a video sequence. Between the first frame of the video sequence and a subsequent frame, the subject may move from the first position 604 to a second position 606 along the motion path 608. A tracking system, such as those described above in relation to FIG. 4 can track the subject and calculate the coordinates of the subject in real 3-D space in real time. The coordinates of the subject can be used to calculate direction, focus, and lighting commands for the camera 602. Thus, as the subject moves to the second position 606, the camera 602 can follow the subject. The camera 602 can also adjust its zoom characteristics such that the subject in the second position 606 is sized similarly to the subject in the first position 604. Additionally, if the camera 602 includes a ring light, the intensity of the light can be reduced as the subject moves to the second position 606.

Figure 7:
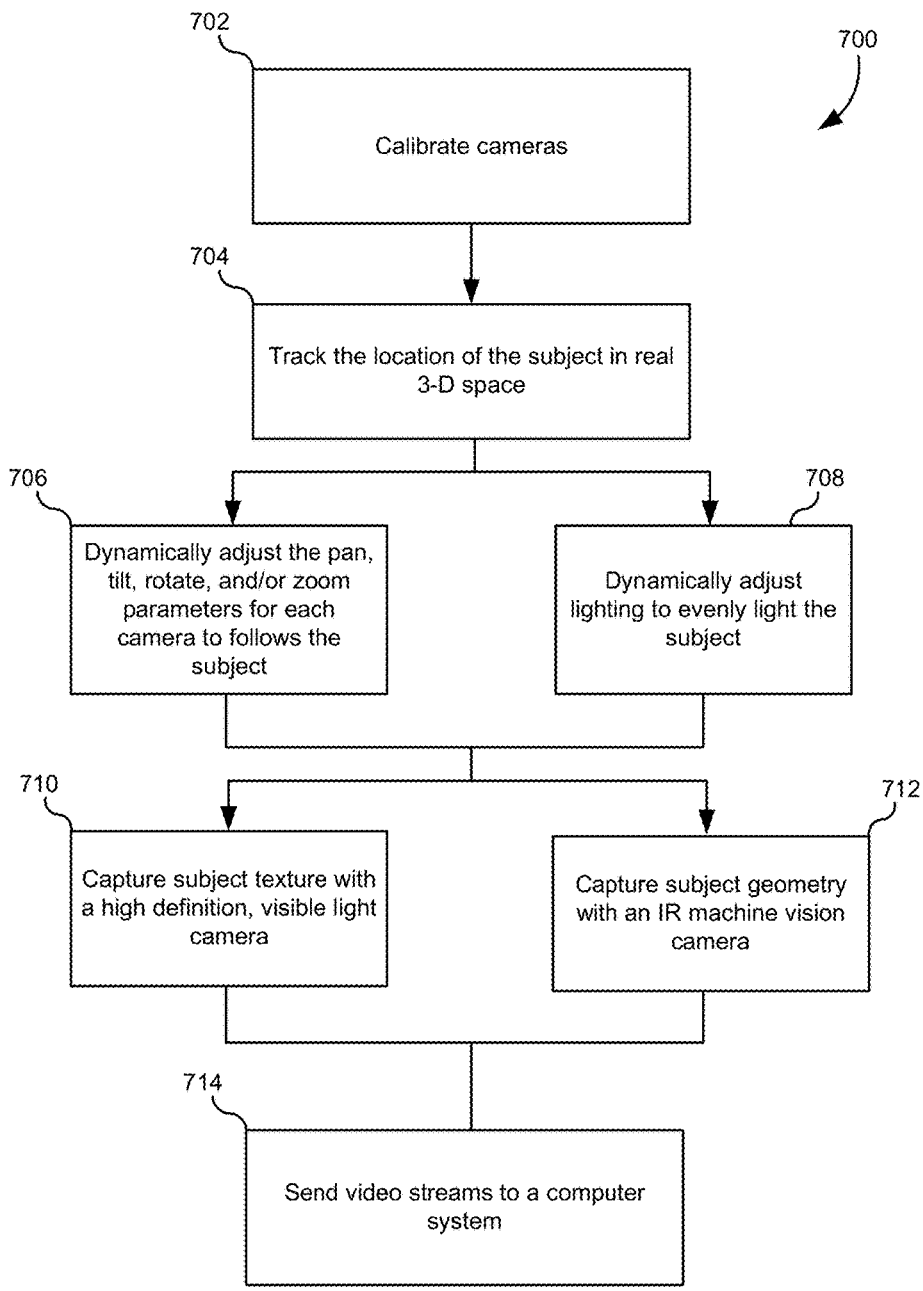
FIG. 7 illustrates a flowchart of a method for capturing a plurality of video sequences of the subject, according to some embodiments.

FIG. 7 illustrates a flowchart 700 of a method for capturing a plurality of video sequences of the subject, according to some embodiments. Generally, this method can be carried out using the camera systems, computer systems, and motion capture areas described above and elsewhere in this disclosure. The method may include calibrating the cameras (702). After the cameras have been calibrated, a motion capture subject can perform a motion sequence within the motion capture area. As a subject moves, the subject location can be tracked in real 3-D space (704). The subject may be tracked by GPS, RF systems, or two or more cameras that follow the subject through motion capture area. Once the coordinates of the subject in the real 3-D space are known, the coordinates can be used to calculate camera system control commands that can be sent to the various camera systems. It should be noted that in embodiments where wide-angle machine-vision systems are used, this tracking system need not be necessary.

As the subject is tracked through the 3-D space, each of the cameras can be dynamically adjusted by altering the pan, tilt, rotate, and/or zoom parameters for each camera such that the subject stays in constant view of the camera frame (706). Optionally, dynamic lighting may also be controlled by the computer system such that the subject is lighted evenly in each of the video sequences captured by the various cameras. (708). Note that in some embodiments, dynamic lighting adjustment may not be necessary when the subject does not undergo a relighting operation in the reconstruction of the 3-D character.

In some embodiments, two separate camera systems may be used to capture the geometry and texture the subject, respectively. First, the texture of the subject can be captured with a high-definition visible light camera (710). Second, the geometry of the subject can be captured using a machine vision camera (712). In some embodiments, the machine vision camera can be lower resolution and can use a lower frame rate than the camera used to capture the texture. Additionally, the motion vision camera can be configured to receive IR light that is projected onto the subject using one or more IR emitters as described above. Each of the video sequences may then be sent to a computer system for reconstruction and analysis (714).

In some embodiments, the motion capture and reconstruction can be broken down into two phases, with the motion capture phase being completed in one session, and the reconstruction phase being completed in another section. In other embodiments, the reconstruction phase can begin as soon as the computer system begins receiving frames from the video sequences captured by each camera.

Figure 8:
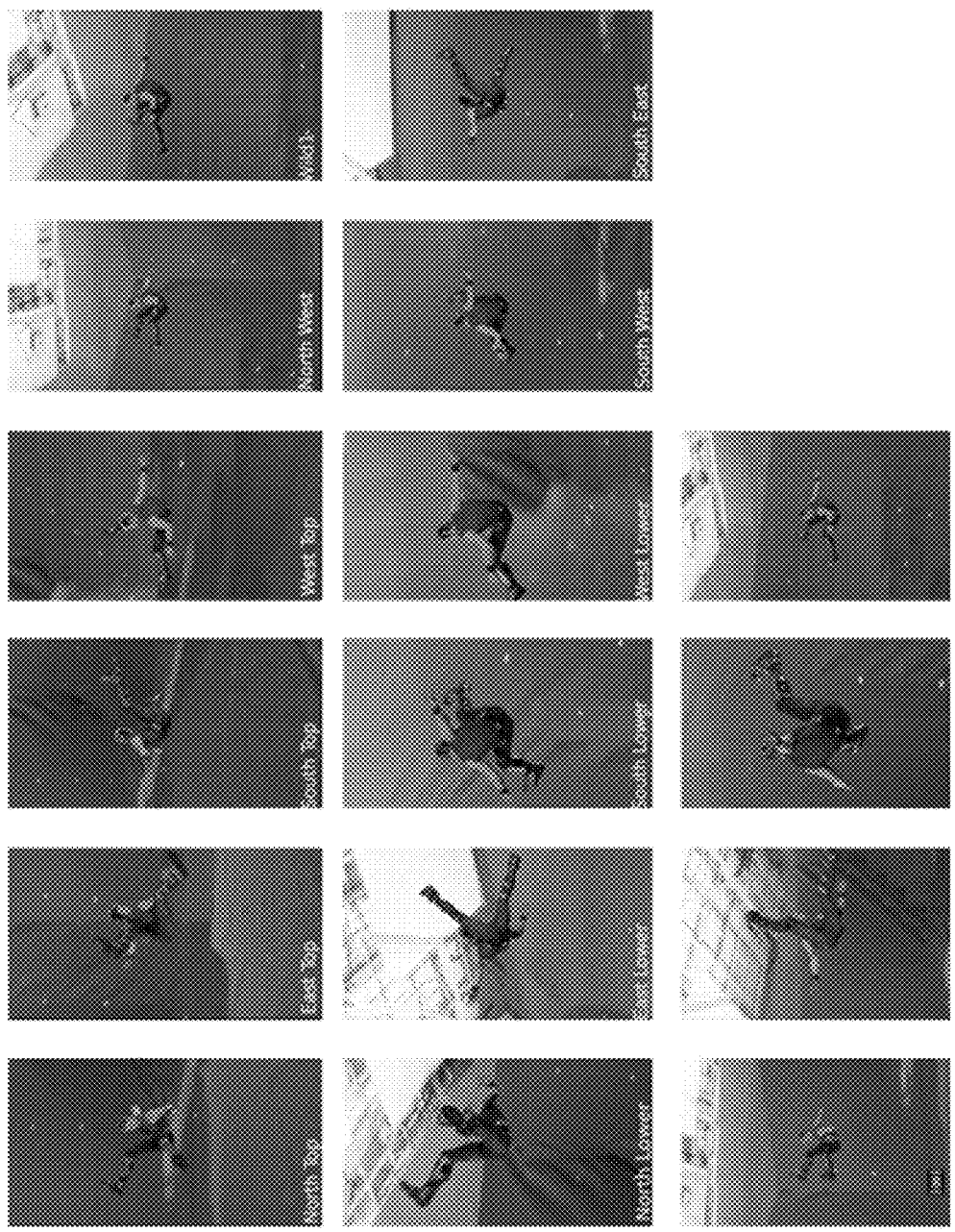
FIG. 8 illustrates images captured from an exemplary camera system, according to some embodiments.

FIG. 8 illustrates images captured from an exemplary camera system, according to some embodiments. In this embodiment, 16 cameras were used to capture video sequences of the subject from various perspectives. Each frame shown in FIG. 8 represents a frame captured of the subject at the same time from different camera. Therefore, FIG. 8 represents numerous perspectives of the subject at the same point in time.

It should be noted that as the subject moves through the motion capture area, each of the cameras stays focused on the motion capture subject, such that the subject is approximately at the center of each frame and approximately the same size in each frame. In order to begin the analysis of the motion capture subject, and the construction of a 3-D representation of the subject's motion, the computer system may begin analyzing sets of frames such as those shown in FIG. 8 that capture the subject at the same point in time.

Figure 9:
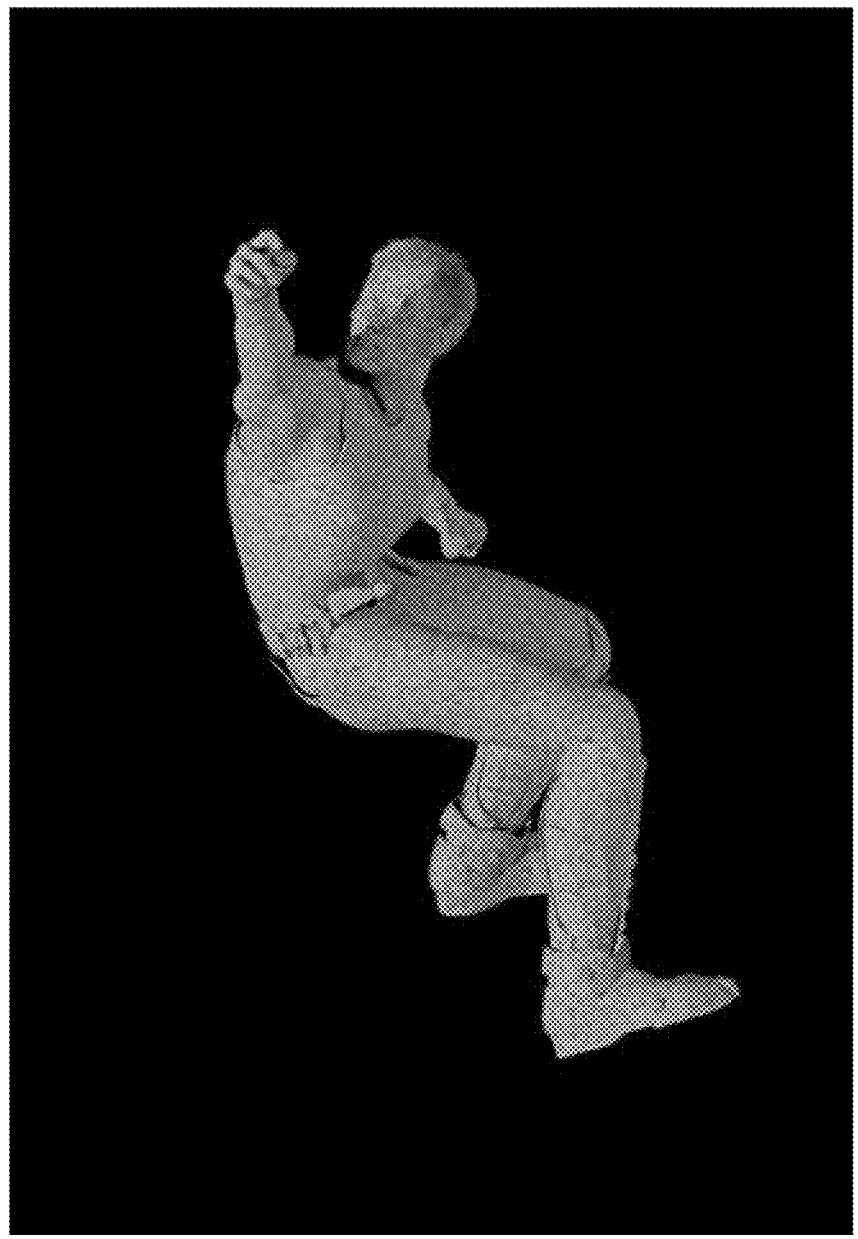
FIG. 9 illustrates an image captured by a machine vision camera of the subject illustrating an infrared pattern and contrasting the image of the subject with a darker background, according to some embodiments.

First, in order to generate a 3-D representation of the subject in each frame, the computer system may begin by analyzing the machine vision video sequences. Embodiments such as those described above where the machine vision camera captures the motion of the subject using the IR emitter/lens combination, the image of the subject in each frame may appear speckled with the IR noise pattern such that the background can easily be separated from the geometry of the subject. FIG. 9 illustrates an image captured by the machine vision camera of the subject illustrating the IR pattern and contrasting the image of the subject with the darker background. A frame such as that illustrated by FIG. 9 can be analyzed for each of the video sequences. For example, in one of the embodiments described above, 16 frames from 16 different cameras can be analyzed. Each of the 16 frames can represent the subject from a different perspective at the same moment in time.

Figure 10:
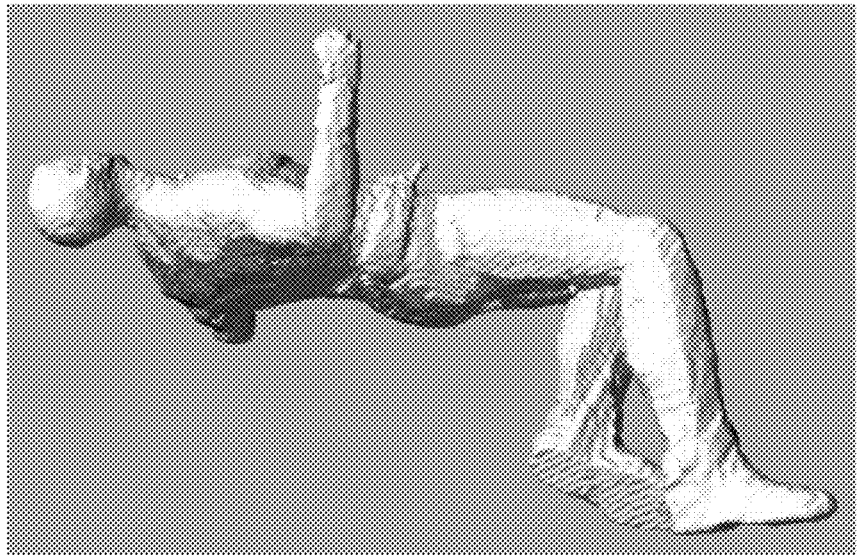
FIG. 10 illustrates cutout silhouettes from a plurality of cameras being combined, according to some embodiments.
Figure 10:
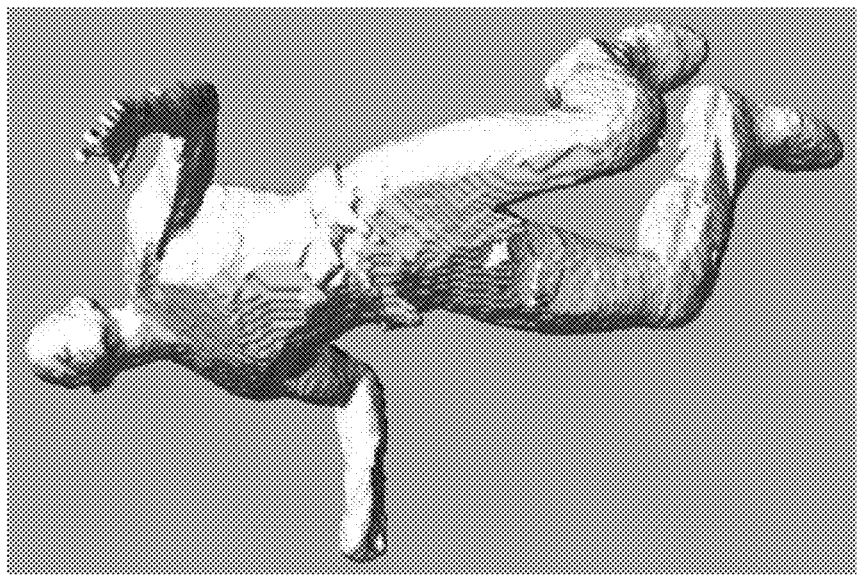

After segmenting the subject from the background, a two-dimensional cutout silhouette of the subject can be obtained from each frame. The two-dimensional cutout silhouette from each frame can then be combined to generate a three-dimensional representation of the geometry of the subject as captured in the real-world video sequences. FIG. 10 illustrates cutout silhouettes from a plurality of cameras being combined, according to some embodiments. After the cut out in each frame has been identified, the computer system can determine or identify where the outlines of each cutout silhouette intersect between each of the corresponding frames. The intersections can be used to generate a three-dimensional shell of the subject. This multi-viewer construction system may also use the camera calibration and positional inputs to be able to infer the surface of subject geometry.

In some embodiments, the 3-D shell of the subject can be combined with a very high resolution 3-D digital model of the subject. This 3-D digital model may comprise a preexisting scan of the volume of the subject. Generally, the 3-D digital model can be combined with the 3-D shell of the subject in order to fill in any holes or smooth any surfaces that were imperfectly estimated by the multi-viewer construction system using the various camera frames. By combining the estimated 3-D shell with the 3-D digital model, a very high quality surface of the subject geometry can be created for each frame without any holes or artifacts. For example, the 3-D digital model can be used to solve for outlier calculations in creating the 3-D shell the subject. The 3-D digital model can, for example, reveal that an arm of the subject is a particular thickness, the elbow is in a particular place, the shoulders are in a particular alignment, and/or the like. The 3-D digital model can also be used to fill in holes in the 3-D shell that were not captured by any of the cameras. This may include hard-to-see places, such as bottoms of feet, armpits, between fingers, and/or the like.

Figure 11:
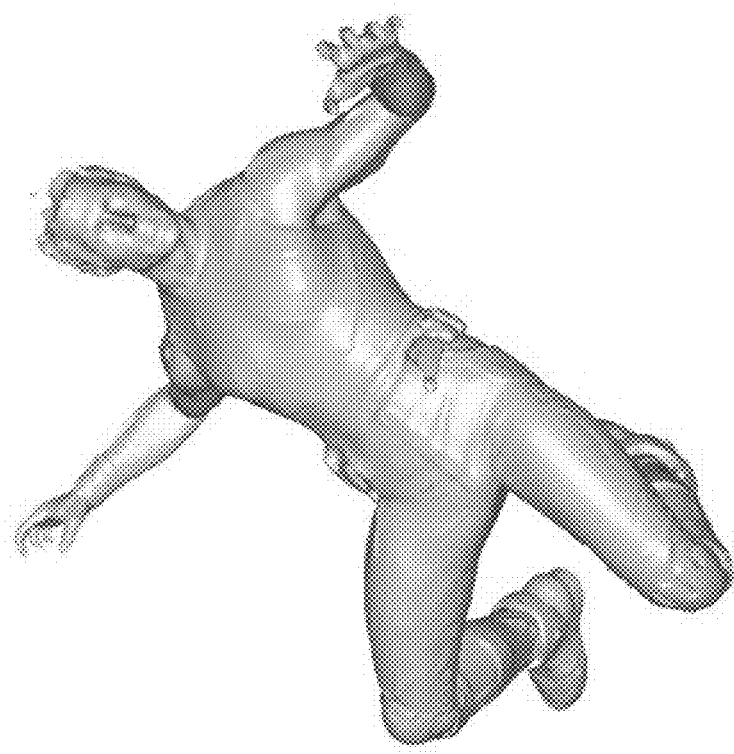
FIG. 11 illustrates a final 3-D representation of the subject that is based on both a 3-D shell and a 3-D digital model.

The combination of the 3-D shell created from the various camera frames and the 3-D digital model may be referred to herein as a 3-D representation of the subject. Note that in some embodiments, the 3-D representation of the subject may depend entirely on the captured video sequences. In other embodiments, the 3-D representation of the subject may be constructed from the combined 3-D shell and 3-D digital model as described above. FIG. 11 illustrates a final 3-D representation of the subject that is based on both the 3-D shell and the 3-D digital model. This 3-D representation of the subject can be generated for each frame in the video sequences provided by the various cameras, resulting in a single 3-D animation of the motion of the subject in a virtual 3-D space.

Some embodiments can utilize the 3-D representation as an input to a 3-D printer. In these embodiments, a 3-D printer can generate a physical model of the subject at one or more snapshot times during the motion sequence. These embodiments may operate in a stand-alone fashion, or may be used in conjunction with the texture, relighting, and view generation algorithms described below. Some embodiments may use the 3-D representation to generate a physical model, and use the texture to add color and texture to the physical model.

After the 3-D representation of the subject as been generated to represent the geometry of the subject, the 3-D representation can have the lighting, colors, and textures applied as captured in the video sequences. A position solver can be used to analyze the textures (such as RGB pixels) in the video sequence frames for the 3-D representation. In some embodiments, the computer system can correlate pixels between each view in which the pixel is visible. By knowing the location and orientation/zoom of each camera, pixel locations can be triangulated and applied to the 3-D representation. In essence, the computer system can extend rays from each camera located in the virtual 3-D space and find the intersection point between camera frames to calculate the depth of each pixel. In general, multiple cameras will have a view of each pixel at any given time. For example, in the 16 camera configuration described above, it would be typical for at least 4 to 5 cameras to have a view of each pixel.

Some embodiments can subtract the lighting characteristics from the texture of the 3-D representation. When lights are placed around the volume, there will still be curvatures or convex services that are not fully exposed to the lighting, and therefore are shadowed or shaded to appear darker than their actual color. In this step, a zero lighting position can be calculated to determine how much any surface point on the 3-D representation is in a shadow. Some embodiments can then mathematically divide by this calculation to produce a balanced representation of the textural illumination. For example, even with lights around a human subject, the subject's armpit will still generally be shaded or dark because the shoulder will generally block light underneath the arm. Because the computer system knows the shape of the 3-D representation and knows the location of all of the lights, the extent to which the shadowing affects the illumination of the armpit can be calculated. The relatively small amount of light that remains in the armpit will be designated as the zero light threshold, and the remainder of the lighting on the 3-D representation can be divided by this number. This can provide an accurate representation of the color of each pixel independent of high or low lighting conditions.

In some cases, an absolute occlusion of textures may be present on the 3-D representation. For example, it is possible that a subject's armpit is completely covered in every frame at a certain point in time. Generally, the more cameras capturing the subject, the lower the probability that absolute occlusion can occur. However, in balancing the cost of cameras with performance, at least some occlusions may be likely. In order to generate the geometry, the 3-D digital model can be used to fill in these holes as described above. In order to fill the textures, pixels from prior or subsequent frames can be used. For example, if none of the cameras at time T3 capture a view of the subject armpit, then frames from time T0, T1, T4, and so forth can be used to fill in the texture at time T3.

Because pixels from multiple frames of different cameras may be available for each point of surface texture on the 3-D representation of the subject, the computer system can select which of the available pixels is most relevant for the particular view being generated of the 3-D representation of the subject. Some embodiments may use what is referred to herein as "view-dependent texture reconstruction." This method can be used because the geometry of the 3-D representation of the subject will not always be perfect. Because the geometry is not perfect, any misalignment between the geometry and the photographed images used to reconstruct texture will show up negatively, or may at least produce adverse effects in the final visual effects shot. Therefore, when new camera views of the 3-D representation of the subject in 3-D virtual space are created, the real-world camera views from the original camera photography that are most closely related to what would be seen through the virtual camera views can be used. For example, three cameras may view a pixel at a point in time during the motion of the subject. As the 3-D representation of the subject moves through the virtual 3-D space, a virtual camera can be placed in any location to create a new camera view of the motion sequence. At the point in time in question, one of the real-world cameras (for instance, the second of the three cameras) may generate a view that is closer to the view of the virtual camera than the other two real-world cameras. Therefore, the pixel from the second camera could be used primarily for the texture of that surface point for the view of the virtual camera.

Figure 12:
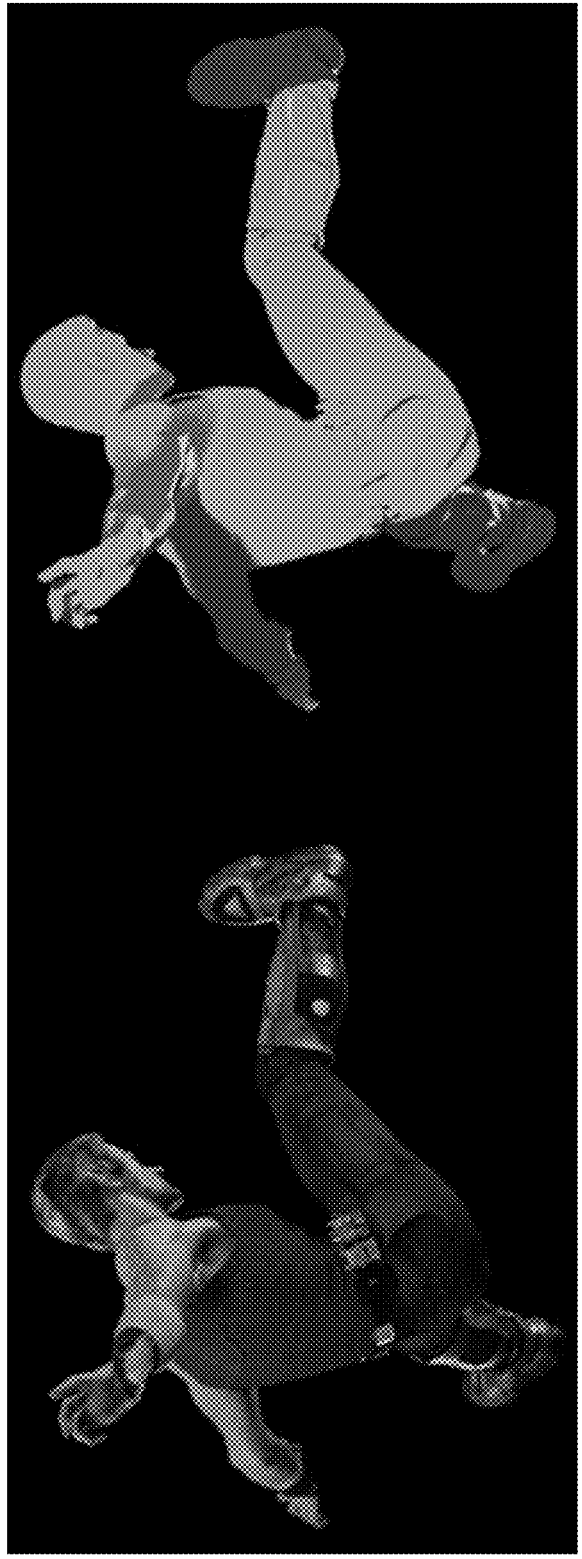
FIG. 12 illustrates a representation of view-dependent texture reconstruction, according to some embodiments.

FIG. 12 illustrates a representation of view-dependent texture reconstruction, according to some embodiments. The representation of the figure on the left illustrates the view of the virtual camera being generated of the subject. The representation of the figure on the right illustrates how pixels from different cameras can be used to generate the representation on the left. The lighter shaded areas of the figure on the right can represent pixels from a first camera. Similarly, the darker shading on the arm and left leg of the subject can represent pixels from a second camera. Finally, the shading on the right foot of the character can represent pixels from a third camera. As the subject moves through the 3-D virtual space, or as the virtual camera changes position, the pixels used for each frame can be dynamically changed based on the relationship between the virtual camera view and the physical camera views.

Figure 13:
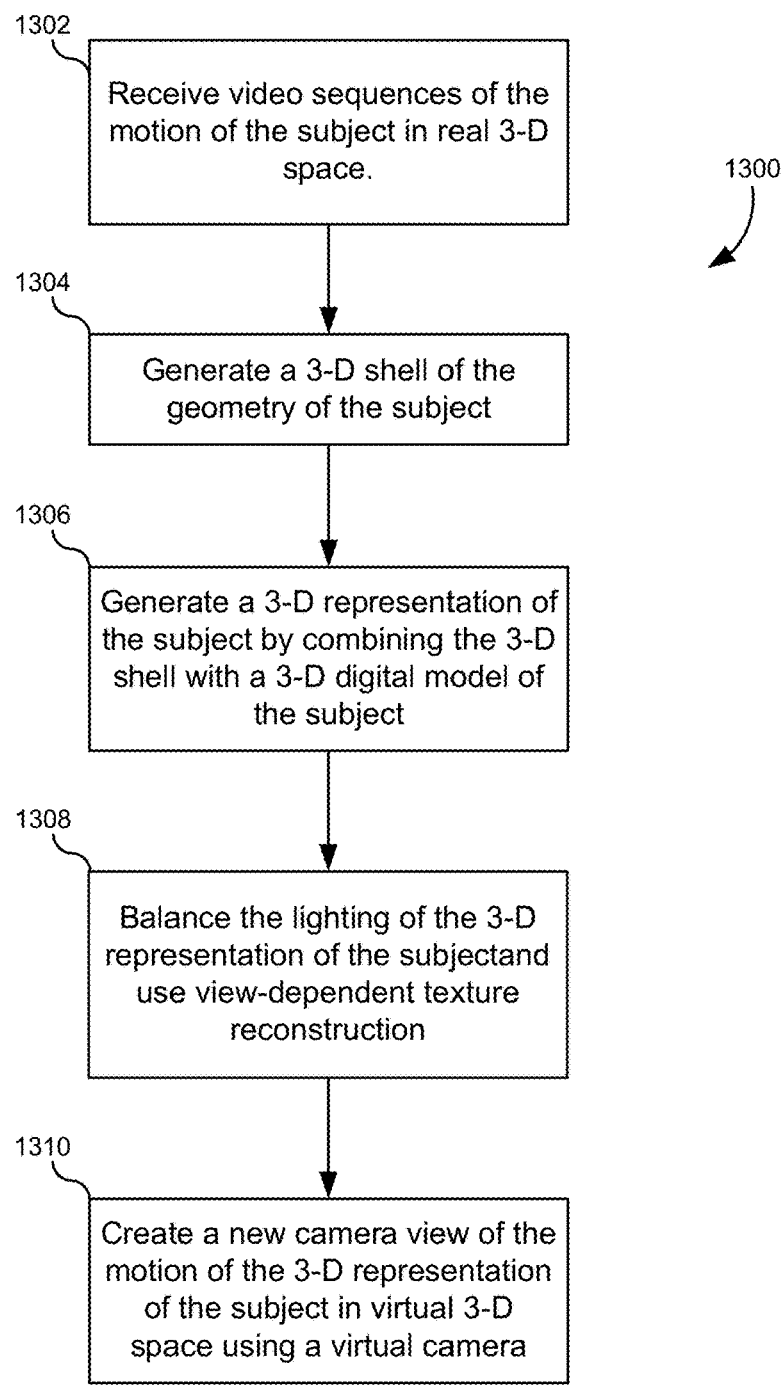
FIG. 13 illustrates a flowchart of a method for generating a 3-D representation of the subject in virtual 3-D space, according to some embodiments.

FIG. 13 illustrates a flowchart 1300 of a method for generating a 3-D representation of the subject in virtual 3-D space, according to some embodiments. The method may include receiving video sequences of the motion of the subject in real 3-D space (1302). As described above, the video sequences may be captured by a plurality of cameras filming the subject in the real world. The method may also include generating a 3-D shell of the geometry the subject (1304). The 3-D shell can be constructed by segmenting the subject from the background in each frame and generating a 2-D cutout silhouette. The 2-D cutout silhouettes from the different camera views can be used to generate a volumetric representation of the geometry of the subject for each frame. The 3-D volumetric representation may be placed in a virtual 3-D space. The camera images may be received from a machine vision system configured to receive an infrared pattern projected onto the subject in the real world 3-D space.

The method may additionally include generating a 3-D representation of the subject by combining the 3-D shell with a 3-D digital model of the subject (1306). The 3-D digital model of the subject can be a high definition model of the subject that is created using a process separate from the video capture of the subject motion from multiple perspectives as described above. In some embodiments, the 3-D digital model of the subject can be created by scanning the body of the subject. The digital 3-D model of the subject can be used to fill in holes and provide a framework onto which the 3-D shell can be incorporated.

The method may further include balancing the lighting of the 3-D representation of the subject and using view-dependent texture reconstruction (1308). The lighting can be balanced by calculating a zero light intensity threshold and dividing the illumination on the subject by the zero light intensity threshold. The view-dependent texture reconstruction can use pixels from real-world camera views that are most relevant to the virtual camera view as described above. The method may also include creating a new camera view of the motion of the 3-D representation of the subject in the virtual 3-D space using a virtual camera (1310).

Figure 14:
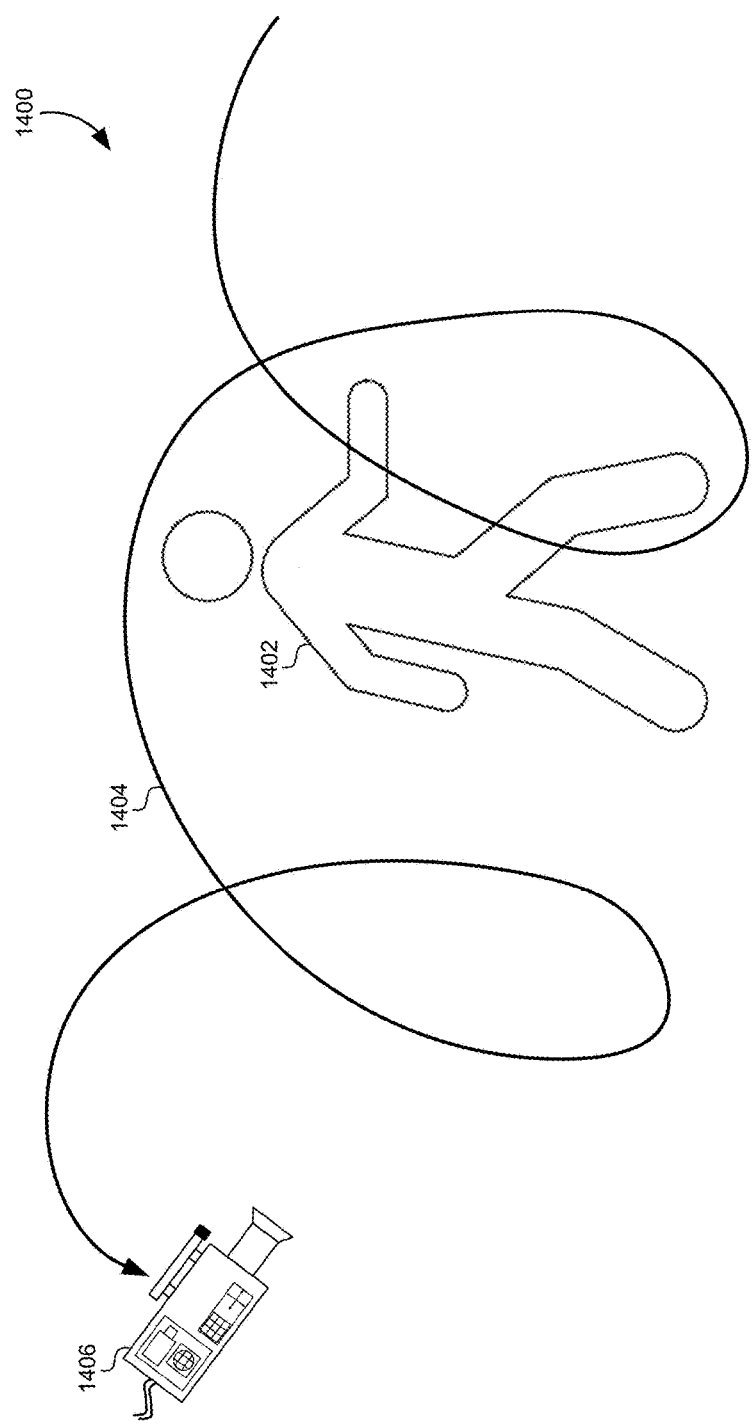
FIG. 14 illustrates a new camera view in a virtual 3-D space, according to some embodiments.

FIG. 14 illustrates a new camera view in a virtual 3-D space, according to some embodiments. The scene 1400 in FIG. 14 is represented in a virtual 3-D space. As described above, the motion of the subject 1402 in the virtual 3-D space is nearly identical to the motion of the subject in the real 3-D space, and the subject 1402 in the virtual 3-D space can be constructed using the camera system and computer methods described above. A virtual camera 1406 in the virtual 3-D space can be positioned and moved throughout the scene 1400 in ways that can be difficult to re-create in the real-world space. As illustrated in FIG. 14, the virtual camera 1406 can be moved around the virtual 3-D space along a path 1404 that is different from the views captured by the statically-placed cameras in the real world scene.

The camera equipment used to capture the motion of the subject in the real 3-D space may in some cases be very expensive. For example, the Sony F65 cameras used in one exemplary embodiment may cost hundreds of thousands of dollars each. Therefore, it may be advantageous to test algorithms for reconstructing the 3-D representation of the subject in the absence of an actual real-world camera system.

Figure 15:
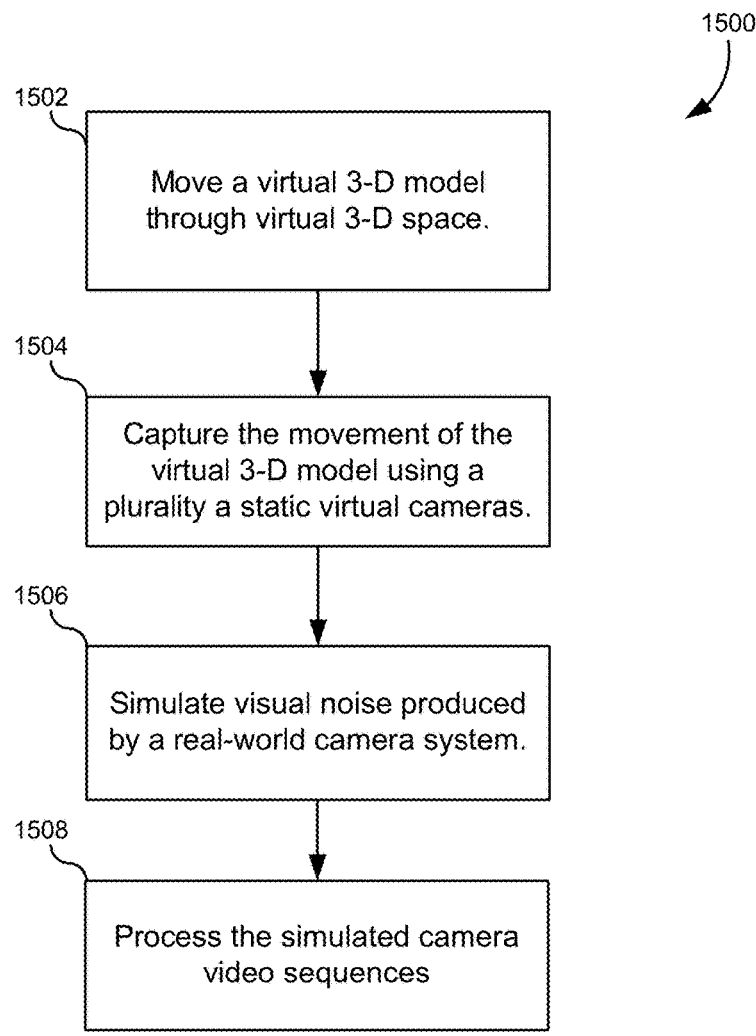
FIG. 15 illustrates a flowchart of a method for testing algorithms for reconstructing a 3-D representation of the subject, according to some embodiments.

FIG. 15 illustrates a flowchart 1500 of a method for testing the algorithms for reconstructing the 3-D representation of the subject, according to some embodiments. The method may include moving a virtual 3-D model through virtual 3-D space (1502). The virtual 3-D model can be a pre-existing model of the subject, and the virtual 3-D space can include background objects and textures that would mimic those found in a real world scene. In essence, moving the virtual model through the virtual space replaces a real-world subject moving through real-world space. The method may additionally include capturing the movement of the virtual 3-D model using a plurality of static virtual cameras (1504). These cameras can be placed throughout the virtual 3-D space in a manner that would be similar to the placement of the cameras in the real-world space. Each of the static virtual cameras can generate a video sequence of the subject's movement through the virtual 3-D space that would be similar to the video sequences captured by real-world cameras.

The method may further include simulating visual noise produced by a real-world camera system (1506). The visual noise inherent in real world camera images can be duplicated in the virtual images in order to provide realistic video sequences for testing. If the virtual video streams without noise were used, the algorithms would not generate an accurate representation of how they would perform using real-world data. By adding visual noise approximated for a real-world camera system, virtual camera video sequences can be made to mimic the type of data that would be received from real-world camera video sequences. The method may then include processing the simulated camera video sequences (1508). At this point, the simulated camera video sequences can be treated the same as real-world camera sequences would be treated, and the algorithms can be thoroughly vetted before the expensive construction of real-world camera systems proceeds.

It should be appreciated that the specific steps illustrated in the flowcharts of this disclosure provide particular methods of capturing and re-creating a scene to use novel camera views, according to various embodiments. Other sequences of steps may also be performed according to alternative embodiments. For example, alternative embodiments of the present invention may perform the steps outlined above in a different order. Moreover, the individual steps illustrated in the flowcharts of this disclosure may include multiple substeps that may be performed in various sequences as appropriate to the individual step. Furthermore, additional steps may be added or removed depending on the particular applications. One of ordinary skill in the art would recognize many variations, modifications, and alternatives.

Figure 16:
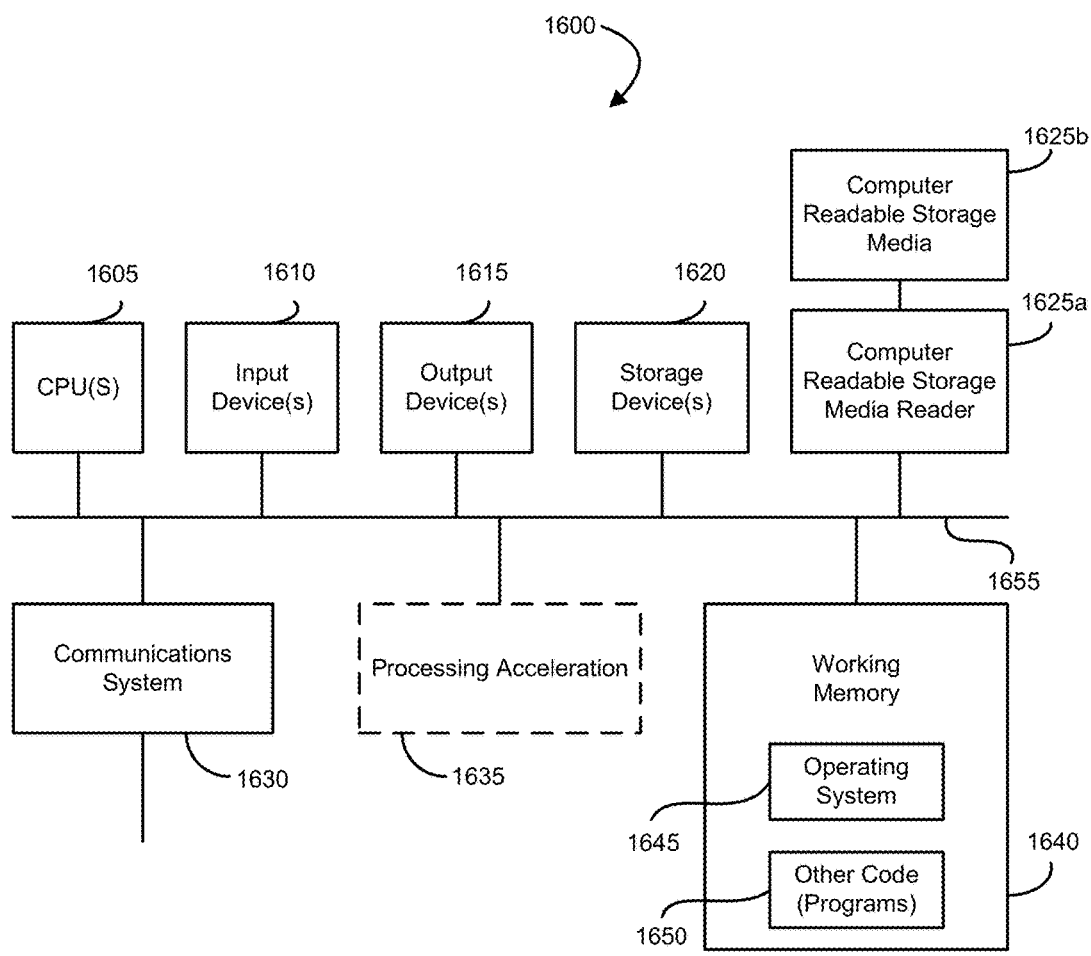
FIG. 16 illustrates a block diagram of an exemplary computer system in which embodiments of the present invention may be implemented.

Each of the embodiments disclosed herein may be implemented in a special-purpose computer system. FIG. 16 illustrates an exemplary computer system 1600, in which parts of various embodiments of the present invention may be implemented. The system 1600 may be used to implement any of the computer systems described above. The computer system 1600 is shown comprising hardware elements that may be electrically coupled via a bus 1655. The hardware elements may include one or more central processing units (CPUs) 1605, one or more input devices 1610 (e.g., a mouse, a keyboard, etc.), and one or more output devices 1615 (e.g., a display device, a printer, etc.). The computer system 1600 may also include one or more storage device 1620. By way of example, storage device(s) 1620 may be disk drives, optical storage devices, solid-state storage device such as a random access memory ("RAM") and/or a read-only memory ("ROM"), which can be programmable, flash-updateable and/or the like.

The computer system 1600 may additionally include a computer-readable storage media reader 1625a, a communications system 1630 (e.g., a modem, a network card (wireless or wired), an infra-red communication device, etc.), and working memory 1640, which may include RAM and ROM devices as described above. In some embodiments, the computer system 1600 may also include a processing acceleration unit 1635, which can include a DSP, a special-purpose processor and/or the like.

The computer-readable storage media reader 1625a can further be connected to a computer-readable storage medium 1625b, together (and, optionally, in combination with storage device(s) 1620) comprehensively representing remote, local, fixed, and/or removable storage devices plus storage media for temporarily and/or more permanently containing computer-readable information. The communications system 1630 may permit data to be exchanged with the network 1620 and/or any other computer described above with respect to the system 1600.

The computer system 1600 may also comprise software elements, shown as being currently located within a working memory 1640, including an operating system 1645 and/or other code 1650, such as an application program (which may be a client application, web browser, mid-tier application, RDBMS, etc.). It should be appreciated that alternate embodiments of a computer system 1600 may have numerous variations from that described above. For example, customized hardware might also be used and/or particular elements might be implemented in hardware, software (including portable software, such as applets), or both. Further, connection to other computing devices such as network input/output devices may be employed. Software of computer system 1600 may include code 1650 for implementing embodiments of the present invention as described herein.

Each of the methods described herein may be implemented by a computer system, such as computer system 1600 in FIG. 16. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
 receiving a plurality of 2-D video sequences of a subject in a real 3-D space, wherein each 2-D video sequence in the plurality of 2-D video sequences depicts the subject from a different perspective;
 generating a 3-D representation of the subject in a virtual 3-D space, wherein:
  a geometry and texture of the 3-D representation is generated based on the plurality of 2-D video sequences;
  a motion of the 3-D representation in the virtual 3-D space is based on a motion of the subject in the real 3-D space; and
  an outer surface of the 3-D representation is missing information, and the texture of the 3-D representation is missing texture information;
 generating a full 3-D representation of the subject in the virtual 3-D space by at least combining the 3-D representation of the subject with an existing 3-D digital model, wherein:
  the 3-D digital model is generated using a 3-D scan of a volume of the subject in the real 3-D space, and the 3-D scan is of the same subject that was captured in the 2-D video sequence; and
  the 3-D digital model is used to fill in the missing information of the 3-D representation by:
   smoothing the outer surface of the 3-D representation;
   filling volumetric holes in the 3-D representation that were not visible in the plurality of 2-D video sequences; and
   properly aligning or dimensioning the 3-D representation;
 generating the missing texture information using corresponding pixels in prior or subsequent frames of a motion of the of the full 3-D representation; and
 generating a 2-D video sequence of the motion of the full 3-D representation using a virtual camera in the virtual 3-D space, wherein a perspective of the virtual camera is different than the perspectives of the plurality of 2-D video sequences.

2. The method of claim 1, wherein the geometry of the 3-D representation is generated using a machine vision system comprising an infrared projector and a machine vision camera.

3. The method of claim 1, wherein generating the 3-D representation of the subject in the virtual 3-D space comprises generating a 2-D cutout silhouette for each frame in the 2-D video sequences, and combining the 2-D cutout silhouettes to generate a volumetric 3-D shell of the subject.

4. The method of claim 1, wherein the texture of the 3-D representation is based on a high definition camera system wherein a plurality of cameras track the motion of the subject through the real 3-D space.

5. The method of claim 1, further comprising equalizing the lighting on the 3-D representation of the subject, and re-lighting the 3-D representation of the subject in the virtual 3-D space.

6. The method of claim 1, wherein the texture of the 3-D representation is generated using view-dependent texture reconstruction that uses pixels from real-world cameras that are most relevant to the view of the virtual camera.

7. The method of claim 1, further comprising receiving position information from a plurality of cameras used to capture the plurality of 2-D video sequences, and sending commands configured to calibrate the plurality of cameras.

8. A system comprising:
 one or more processors; and
 a non-transitory storage memory comprising instructions which, when executed by the one or more processors, cause the one or more processors to perform operations including:
  receiving a plurality of 2-D video sequences of a subject in a real 3-D space, wherein each 2-D video sequence in the plurality of 2-D video sequences depicts the subject from a different perspective;
  generating a 3-D representation of the subject in a virtual 3-D space, wherein:
   a geometry and texture of the 3-D representation is generated based on the plurality of 2-D video sequences;
   a motion of the 3-D representation in the virtual 3-D space is based on a motion of the subject in the real 3-D space; and
   an outer surface of the 3-D representation is missing information, and the texture of the 3-D representation is missing texture information;
  generating a full 3-D representation of the subject in the virtual 3-D space by at least combining the 3-D representation of the subject with an existing 3-D digital model, wherein:
   the 3-D digital model is generated using a 3-D scan of a volume of the subject in the real 3-D space, and the 3-D scan is of the same subject that was captured in the 2-D video sequence; and
   the 3-D digital model is used to fill in the missing information of the 3-D representation by:
    smoothing the outer surface of the 3-D representation;
    filling volumetric holes in the 3-D representation that were not visible in the plurality of 2-D video sequences; and properly aligning or dimensioning the 3-D representation;

generating the missing texture information using corresponding pixels in prior or subsequent frames of a motion of the of the full 3-D representation; and generating a 2-D video sequence of the motion of the full 3-D representation using a virtual camera in the virtual 3-D space, wherein a perspective of the virtual camera is different than the perspectives of the plurality of 2-D video sequences.

9. The system of claim 8, wherein the geometry of the 3-D representation is generated using a machine vision system comprising an infrared projector and a machine vision camera.

10. The system of claim 8, wherein generating the 3-D representation of the subject in the virtual 3-D space comprises generating a 2-D cutout silhouette for each frame in the 2-D video sequences, and combining the 2-D cutout silhouettes to generate a volumetric 3-D shell of the subject.

11. The system of claim 8, wherein the texture of the 3-D representation is based on a high-definition camera system wherein a plurality of cameras track the motion of the subject through the real 3-D space.

12. The system of claim 8, wherein the instructions cause the one or more processors to perform operations further comprising:

equalizing the lighting on the 3-D representation of the subject, and re-lighting the 3-D representation of the subject in the virtual 3-D space.

13. The system of claim 8, wherein the texture of the 3-D representation is generated using view-dependent texture reconstruction that uses pixels from real-world cameras that are most relevant to the view of the virtual camera.

14. The system of claim 8, wherein the instructions cause the one or more processors to perform operations further comprising:

receiving position information from a plurality of cameras used to capture the plurality of 2-D video sequences, and sending commands configured to calibrate the plurality of cameras.

15. A non-transitory storage medium comprising instructions which, when executed by one or more processors, cause the one or more processors to perform operations comprising:

receiving a plurality of 2-D video sequences of a subject in a real 3-D space, wherein each 2-D video sequence in the plurality of 2-D video sequences depicts the subject from a different perspective;

generating a 3-D representation of the subject in a virtual 3-D space, wherein:

a geometry and texture of the 3-D representation is generated based on the plurality of 2-D video sequences;

a motion of the 3-D representation in the virtual 3-D space is based on a motion of the subject in the real 3-D space; and an outer surface of the 3-D representation is missing information, and the texture of the 3-D representation is missing texture information;

generating a full 3-D representation of the subject in the virtual 3-D space by at least combining the 3-D representation of the subject with an existing 3-D digital model, wherein:

the 3-D digital model is generated using a 3-D scan of a volume of the subject in the real 3-D space, and the 3-D scan is of the same subject that was captured in the 2-D video sequence; and the 3-D digital model is used to fill in the missing information of the 3-D representation by:

smoothing the outer surface of the 3-D representation;

filling volumetric holes in the 3-D representation that were not visible in the plurality of 2-D video sequences; and properly aligning or dimensioning the 3-D representation;

generating the missing texture information using corresponding pixels in prior or subsequent frames of a motion of the of the full 3-D representation; and generating a 2-D video sequence of the motion of the full 3-D representation using a virtual camera in the virtual 3-D space, wherein a perspective of the virtual camera is different than the perspectives of the plurality of 2-D video sequences.

16. The storage medium of claim 15, wherein the geometry of the 3-D representation is generated using a machine vision system comprising an infrared projector and a machine vision camera.

17. The storage medium of claim 15, wherein generating the 3-D representation of the subject in the virtual 3-D space comprises generating a 2-D cutout silhouette for each frame in the 2-D video sequences, and combining the 2-D cutout silhouettes to generate a volumetric 3-D shell of the subject.

* * * * *